(12) United States Patent
Takama et al.

(10) Patent No.: US 8,953,109 B2
(45) Date of Patent: Feb. 10, 2015

(54) IMAGE DISPLAY APPARATUS AND VARIABLE LENS ARRAY

(71) Applicant: Japan Display West Inc., Aichi (JP)

(72) Inventors: Daisuke Takama, Kanagawa (JP); Takeo Koito, Kanagawa (JP)

(73) Assignee: Japan Display West Inc., Aichi (JP)

( * ) Notice: Subject to any disclaimer, the term of this patent is extended or adjusted under 35 U.S.C. 154(b) by 0 days.

(21) Appl. No.: 14/184,077

(22) Filed: Feb. 19, 2014

(65) Prior Publication Data

US 2014/0168547 A1     Jun. 19, 2014

Related U.S. Application Data

(62) Division of application No. 13/353,479, filed on Jan. 19, 2012.

(30) Foreign Application Priority Data

Feb. 24, 2011   (JP) .................................. 2011-038679

(51) Int. Cl.

| G02F 1/1335 | (2006.01) |
|---|---|
| G02B 27/22 | (2006.01) |
| G02B 3/00 | (2006.01) |
| H04N 13/04 | (2006.01) |
| G02B 3/14 | (2006.01) |
| G02B 26/00 | (2006.01) |
| G02F 1/1339 | (2006.01) |
| G02F 1/29 | (2006.01) |

(52) U.S. Cl.
CPC ............ *G02B 27/2214* (2013.01); *G02B 3/005* (2013.01); *H04N 13/0404* (2013.01); *G02B 3/0087* (2013.01); *G02B 3/14* (2013.01); *G02B 26/004* (2013.01); *H04N 13/0454* (2013.01); *G02F 1/13394* (2013.01); *G02F 1/292* (2013.01); *G02F 2001/294* (2013.01)
USPC .............................. 349/15; 349/155; 349/200

(58) Field of Classification Search
None
See application file for complete search history.

(56) References Cited

U.S. PATENT DOCUMENTS

| 6,864,931 B1* | 3/2005 | Kumar et al. .................. 349/88 |
|---|---|---|
| 2010/0195203 A1* | 8/2010 | Zuidema et al. .............. 359/463 |
| 2011/0157499 A1 | 6/2011 | Lee et al. |

FOREIGN PATENT DOCUMENTS

| JP | 2001-133918 | 5/2001 |
|---|---|---|
| JP | 2001-194690 | 7/2001 |
| JP | 2003-186036 | 7/2003 |
| JP | 2006-293241 | 10/2006 |
| JP | 2012-058478 | 3/2012 |

OTHER PUBLICATIONS

Japanese Office Examination Report issued in connection with related Japanese patent application No. 2011-038679 dated Jul. 1, 2014.

* cited by examiner

*Primary Examiner* — Richard Kim
(74) *Attorney, Agent, or Firm* — Dentons US LLP

(57) ABSTRACT

An image display apparatus including an image display section that displays a two-dimensional image; and a variable lens array that includes a first substrate having a first electrode, a second substrate having a second electrode, and a liquid crystal layer which is disposed between the first substrate and the second substrate. The value of the refractive power of each lens line thereof is changed by a voltage which is applied between the first electrode and the second electrode. The variable lens array is disposed to be opposed to the image display section. Wall-shaped or columnar spacers are provided in a place, in which an orientation direction of liquid crystal molecules of the liquid crystal layer is unchanged when the value of the refractive power of each lens line thereof is changed, between the first substrate and the second substrate of the variable lens array.

4 Claims, 30 Drawing Sheets

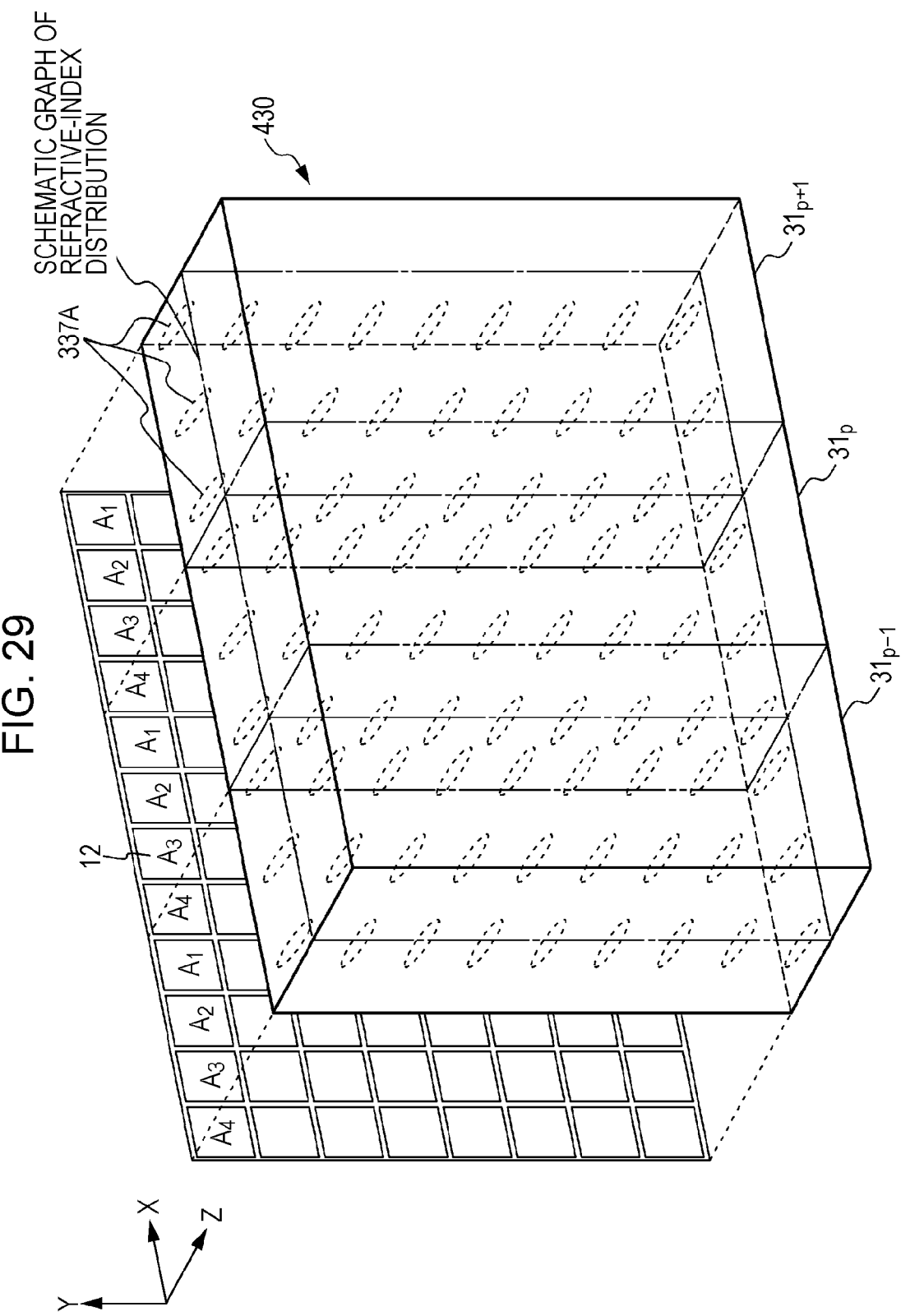

IMAGE DISPLAY APPARATUS AND VARIABLE LENS ARRAY

RELATED APPLICATION DATA

This application is a division of U.S. patent application Ser. No. 13/353,479 filed Jan. 19, 2012, the entirety of which is incorporated herein by reference to the extent permitted by law. The present application claims the benefit of priority to Japanese Patent Application No. JP 2011-038679 filed on Feb. 24, 2011 in the Japan Patent Office, the entirety of which is incorporated by reference herein to the extent permitted by law.

BACKGROUND

The present disclosure relates to an image display apparatus. Further, the present disclosure relates to a variable lens array.

There are various image display apparatuses capable of stereoscopic viewing in a way that an image viewer views two images having parallax. The methods of the image display apparatuses capable of stereoscopic viewing are roughly classified into two methods: a method using glasses in which a parallax image is separately presented to the right and left eyes by glasses; and a naked-eye viewing method in which a parallax image is presented to the right and left eyes without using glasses. As an image display apparatus using the naked-eye viewing method, an image display apparatus, in which a lens array such as a lenticular lens is combined with an image display section for displaying a two-dimensional image, has been practically used.

FIGS. 30A and 30B show conceptual diagrams of operations of the image display apparatus in which the lens array having lens lines is disposed between the image display section and an image viewer.

As shown in FIG. 30A, a bundle of rays, which is emitted from pixel groups indicated by the signs R1, R3, R5, R7, and R9, reaches the point of view 2. Further, as shown in FIG. 30B, a bundle of rays, which is emitted from pixel groups indicated by the signs L2, L4, L6, L8, and L10, reaches the point of view 1. As described above, at a position at a predetermined distance from the image display section, the image at the point of view 1 and the image at the point of view 2 are separately viewed.

The left and right eyes of an image viewer are positioned at the point of view 1 and the point of view 2, the image for the left eye is displayed by the pixel groups indicated by the signs L2, L4, L6, L8, and L10, and the image for the right eye is displayed by the pixel groups indicated by the signs R1, R3, R5, R7, and R9. In this case, the image viewer recognizes the images as a stereoscopic image.

Meanwhile, in the image display apparatus capable of stereoscopic viewing, it is preferable to display a normal image (two-dimensional image) without any problem. In other words, it is preferable to adopt a configuration capable of switching display of the stereoscopic image and display of the normal image. When the refractive power of the lens line of the lens array is variable, it is possible to switch display of the stereoscopic image and display of the normal image.

For example, as shown in FIG. 2 in Japanese Unexamined Patent Application Publication No. 2001-133918, as a variable lens array capable of varying the refractive power of the lens line, a variable lens array has been proposed that has a structure in which a liquid crystal layer is disposed between a pair of transparent substrates having transparent electrodes. In the variable lens array with the structure, the lens line is formed of gradient index lenses using a liquid crystal material, and is thus able to vary the refractive power of the lens line by changing the voltage between the pair of substrates.

SUMMARY

In the variable lens array formed of gradient index lenses (hereinafter simply referred to as liquid crystal GRIN lenses) using a liquid crystal material, it is necessary to hold a predetermined space between the pair of substrates. Since the optical lens lines are formed, the liquid crystal layer of the variable lens array is somewhat thicker than the liquid crystal layer of the normal liquid crystal display panel. For example, when a space between the substrates is held by spherical spacers distributed therebetween, the magnitude of the diameter of each spacer is unignorable as compared with the width of each pixel of the image display apparatus, and thus the orientation of the liquid crystal molecules around the spacers is in chaos, thereby deteriorating the lens performance. Thereby, the image quality of the displayed image deteriorates.

Accordingly, it is the present disclosure desirable to provide an image display apparatus and a variable lens array capable of reducing deterioration of image quality of a displayed image.

According to a first embodiment of the present disclosure, provided is an image display apparatus including: an image display section that displays a two-dimensional image; and a variable lens array that includes a first substrate having a first electrode, a second substrate having a second electrode, and a liquid crystal layer which is disposed between the first substrate and the second substrate, in which a value of a refractive power of each lens line thereof is changed by a voltage which is applied between the first electrode and the second electrode.

In the apparatus, the variable lens array is disposed to be opposed to the image display section.

In the apparatus, wall-shaped or columnar spacers are provided in a place, in which an orientation direction of liquid crystal molecules of the liquid crystal layer is unchanged when the value of the refractive power of each lens line thereof is changed, between the first substrate and the second substrate of the variable lens array.

According to a second embodiment of the present disclosure, provided is a variable lens array including: a first substrate having a first electrode; a second substrate having a second electrode; and a liquid crystal layer that is disposed between the first substrate and the second substrate.

In the variable lens array, a value of a refractive power of each lens line thereof is changed by a voltage which is applied between the first electrode and the second electrode.

In the variable lens array, wall-shaped or columnar spacers are provided in a place, in which an orientation direction of liquid crystal molecules of the liquid crystal layer is unchanged when the value of the refractive power of each lens line thereof is changed, between the first substrate and the second substrate.

According to a third embodiment of the present disclosure, provided is an image display apparatus including: an image display section that displays a two-dimensional image; and a variable lens array that includes a first substrate having a first electrode, a second substrate having a second electrode, and a liquid crystal layer which is disposed between the first substrate and the second substrate, in which a value of a refractive power of each lens line thereof is changed by a voltage which is applied between the first electrode and the second electrode.

In the apparatus, the variable lens array is disposed to be opposed to the image display section.

In the apparatus, wall-shaped or columnar spacers are disposed at center portions of the lens lines.

According to a fourth embodiment of the present disclosure, provided is a variable lens array including: a first substrate having a first electrode; a second substrate having a second electrode; and a liquid crystal layer that is disposed between the first substrate and the second substrate.

In the variable lens array, a value of a refractive power of each lens line thereof is changed by a voltage which is applied between the first electrode and the second electrode.

In the variable lens array, wall-shaped or columnar spacers are disposed at center portions of the lens lines.

According to a fifth embodiment of the present disclosure, provided is an image display apparatus including: an image display section that displays a two-dimensional image; and a variable lens array that includes a first substrate having a first electrode, a second substrate having a second electrode, and a liquid crystal layer which is disposed between the first substrate and the second substrate, in which a value of a refractive power of each lens line thereof is changed by a voltage which is applied between the first electrode and the second electrode.

In the apparatus, the variable lens array is disposed to be opposed to the image display section.

In the apparatus, the wall-shaped or columnar spacers are disposed at boundary portions of the lens lines adjacent to each other.

According to a sixth embodiment of the present disclosure, provided is a variable lens array including: a first substrate having a first electrode; a second substrate having a second electrode; and a liquid crystal layer that is disposed between the first substrate and the second substrate.

In the variable lens array, a value of a refractive power of each lens line thereof is changed by a voltage which is applied between the first electrode and the second electrode.

In the variable lens array, the wall-shaped or columnar spacers are provided at boundary portions of the lens lines adjacent to each other.

In the variable lens array of the present disclosure and/or the variable lens array constituting the image display apparatus of the present disclosure, wall-shaped or columnar spacers are provided in a place in which an orientation direction of liquid crystal molecules of the liquid crystal layer is unchanged when the value of the refractive power of each lens line thereof is changed. Accordingly, the optical relationship between the spacers and the liquid crystal layer around the spacers is basically constant even when the value of the refractive power of the lens line is changed. Thereby, since deterioration in lens performance caused by the spacers is reduced, it is possible to reduce deterioration in image quality of a displayed image.

BRIEF DESCRIPTION OF THE DRAWINGS

FIG. 29 is a schematic perspective view partially illustrating the image display section and the variable lens array;

DETAILED DESCRIPTION OF EMBODIMENTS

Figure 1:
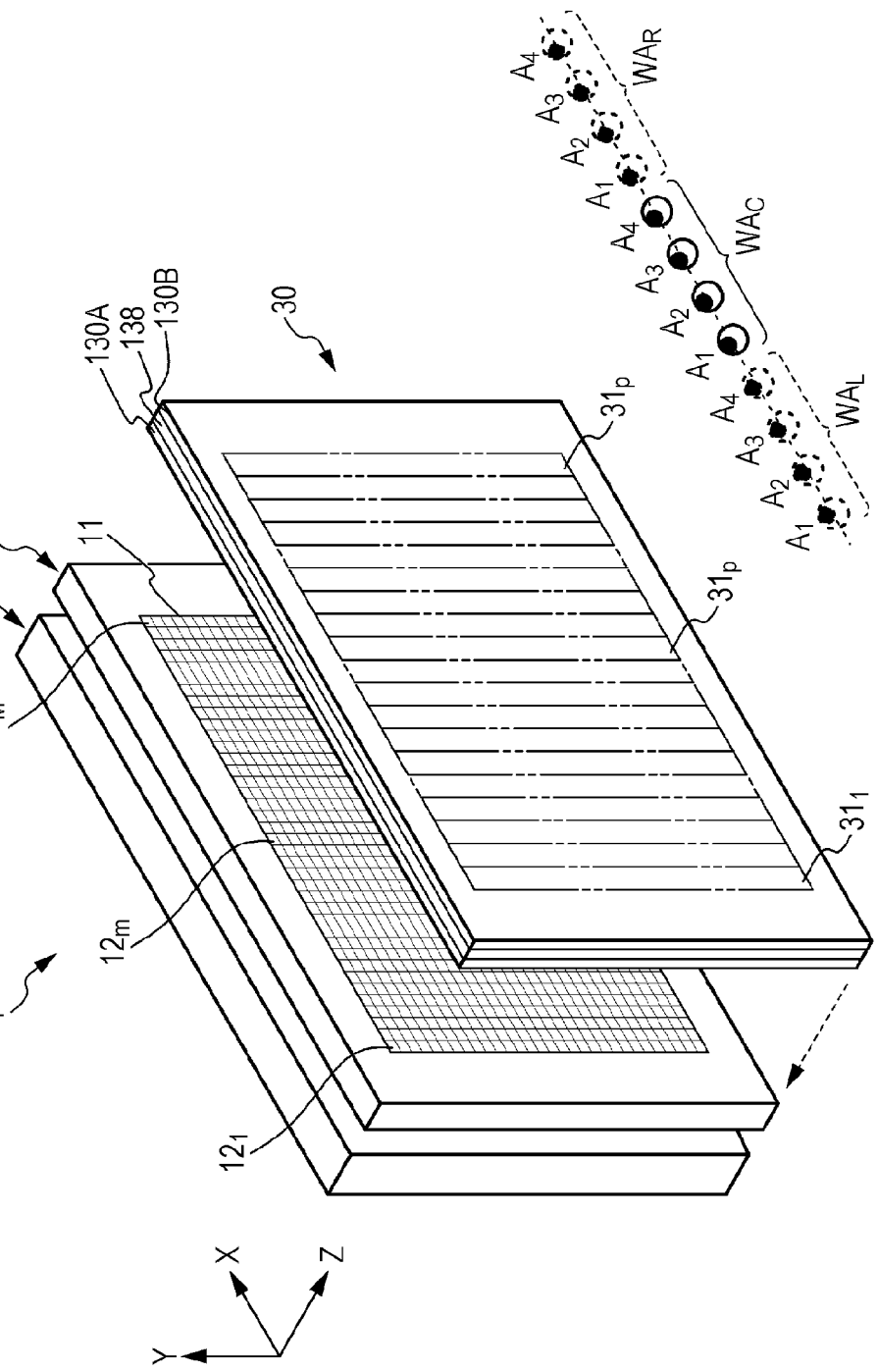
FIG. 1 is a schematic perspective view of an image display apparatus according to a first embodiment when it is virtually disassembled.

Hereinafter, referring to the accompanying drawings, the embodiments of the present disclosure will be described. The disclosure is not limited to the embodiments, various numerical values and materials are examples. In the following description, the same elements and the elements having the same functions are represented by the same reference numerals and signs, and repeated description is omitted. In addition, description will be given in order of the following items.

1. Overview of Image Display Apparatus and Variable Lens Array According to the Disclosure
2. First Embodiment
3. Second Embodiment
4. Third Embodiment
5. Fourth Embodiment (Other)

Overview of Image Display Apparatus and Variable Lens Array According to the Disclosure In the variable lens array of the present disclosure and/or the variable lens array used in the image display apparatus of the present disclosure (hereinafter simply referred to as a variable lens array of the present disclosure), as described above, wall-shaped or columnar spacers are provided in a place in which the orientation direction of liquid crystal molecules of the liquid crystal layer is unchanged when the value of the refractive power of each lens line thereof is changed. Here, the term "the orientation direction of liquid crystal molecules is unchanged" is defined to include not only the case where the orientation direction of liquid crystal molecules is strictly unchanged but also the case where the orientation direction of liquid crystal molecules is substantially unchanged. In other words, various deviations caused in design or manufacture are allowed.

In the case where an image viewer is supposed to press the surface of the variable lens array in a state where the viewer uses the apparatus, in order to secure the so called strength against force on the surface, it is preferable to adopt a configuration using wall-shaped spacers. Alternatively, it is preferable to adopt a configuration in which columnar spacers, of which the number is enough to secure the sufficient strength against force on the surface, are arranged. In addition, the shape of the columnar spacer is not particularly limited, and may be, for example, a prismatic column shape or a cylindrical column shape.

The planar shape of the first electrode in the first substrate and the planar shape of the second electrode in the second substrate may be appropriate for design of the variable lens array. Basically, one of the first electrode and the second electrode is formed as a common electrode having a planar shape, and the other is formed as an electrode having a stripe shape. In addition, when a direct current voltage is continuously applied to the liquid crystal layer, this causes deterioration in liquid crystal material. Therefore, similarly to the normal liquid crystal display panel, the variable lens array may be driven such that the polarity of the voltage between the first electrode and the second electrode is sequentially inverted.

In the variable lens array of the present disclosure including the above-mentioned preferable configuration based on the design of the first electrode and the second electrode and the setting of the voltage applied to them, the wall-shaped or columnar spacers may be configured to be disposed at the center portions of the lens lines, and/or may be configured to be disposed at the boundary portions of the lens lines adjacent to one another.

In the variable lens array of the present disclosure including the above-mentioned preferable configuration, from the viewpoint of securing fluidity of the liquid crystal material, it is preferable that the outer peripheral portion of the first substrate and the outer peripheral portion of the second substrate should be sealed by the sealing portion. Thus, it is also preferable that a space is provided between the end portion of the wall-shaped or columnar spacer and the sealing portion.

The first substrate or the second substrate constituting the variable lens array may be made of an optically transparent material, that is, a material which does not absorb light much. Examples of the material constituting the first substrate or the second substrate include acrylic resin, polycarbonate resin (PC), ABS resin, polymethyl methacrylate (PMMA), polyarylate resin (PAR), polyethylene terephthalate resin (PET), and glass. The materials constituting the first substrate and the second substrate may be the same, or may be different.

The first electrode of the first substrate or the second electrode of the second substrate can be made of a metal thin film having optical transparency or a transparent conductive material such as indium tin oxide (ITO) or indium zinc oxide (IZO). The first electrode or the second electrode can be formed in an existing method such as physical vapor deposition (PVD), which is exemplified by a vacuum deposition or a sputtering, or various chemical vapor deposition (CVD). Further, the electrode can be patterned by an existing method such as a liftoff as a combination of a photolithography and etching.

It is possible to use a nematic liquid crystal and the like for constituting a liquid crystal layer disposed between the first substrate and the second substrate. The material constituting the liquid crystal layer is not particularly limited. As the material, it is possible to use a positive-type liquid crystal material, and it may be possible to use a negative-type liquid crystal material.

At least one of the surfaces of the first substrate and the second substrate close to the liquid crystal layer may be subjected to the alignment process for setting the pretilt angle or the orientation direction of the liquid crystal molecules. The alignment process may be performed by a method for forming an alignment film to be used in the rubbing process. The alignment film can be made of a polyimide material and the like.

The method of forming wall-shaped or columnar spacers is not particularly limited. Examples of a method of forming spacers include a screen printing method and a photosensitizing method. The screen printing method is a method of forming an opening in a screen part corresponding to the part in which the spacers are formed, passing a material for forming the spacers on the screen by using a squeegee, forming a material layer for forming spacers on the substrate, and performing a curing process as necessary. The photosensitizing method is a method of forming the material layer for forming the spacers with photosensitivity on the substrate and patterning the material layer for forming spacers through exposure and image development. The spacers can be made of transparent polymeric and the like.

The sealing portion, which seals the gap between the outer peripheral portion of the first substrate and the outer peripheral portion of the second substrate, can be made of a thermosetting epoxy-based resin and the like.

As the image display section used in the image display apparatus of the present disclosure, it is possible to use an existing display apparatus such as a liquid crystal display panel, an electroluminescence display panel, or a plasma display panel. The image display section may be a monochrome display, and may be a color display.

In the respective embodiments to be described, a transmissive monochrome liquid crystal display panel is used as the image display section. Further, in the embodiments, description will be given under the assumption that the variable lens array is disposed between the image display section and the image viewer. In addition, the structure of the present disclosure is limited to this, and may be configured such that the variable lens array is disposed between the transmissive display panel and the illumination section.

The liquid crystal display panel is formed of, for example, a front panel having a transparent common electrode, a rear panel having transparent pixel electrodes, and a liquid crystal material which is disposed between the front panel and the rear panel. The operation mode of the liquid crystal display panel is not particularly limited. The display panel may be configured to be driven in a so-called TN mode, and may be configured to be driven in a VA mode or an IPS mode.

When the number of pixels M×N of the image display section is represented by (M, N), as values of (M, N), specifically, it is possible to exemplify a few image display resolutions such as VGA (640, 480), S-VGA (800, 600), XGA (1024, 768), APRC (1152, 900), S-XGA (1280, 1024), U-XGA (1600, 1200), HD-TV (1920, 1080), Q-XGA (2048, 1536), (1920, 1035), (720, 480), and (1280, 960). However, the values of (M, N) are not limited to the above-mentioned values.

As the illumination section that illuminates a transmissive display panel from the rear side thereof, it is possible to use an existing illumination device. The configuration of the illumination section is not particularly limited. The illumination section can be formed of a light source, a prism sheet, a diffusion sheet, a light guide plate, and the like.

The driving circuits, which drive image display section and variable lens array, may be constituted by various circuits. These may use existing circuit elements.

It suffices that various conditions described in the specification are strictly established and are substantially established. Various deviations caused in design or manufacture are allowed.

First Embodiment

The first embodiment relates to the image display apparatus and the variable lens array according to the present disclosure.

FIG. 1 is a schematic perspective view of an image display apparatus according to the first embodiment when it is virtually disassembled.

As shown in FIG. 1, the image display apparatus 1 includes: an image display section 10 that displays a two-dimensional image; and a variable lens array 30 that includes the first substrate 130A having the first electrode, the second substrate 130B having the second electrode, and a liquid crystal layer which is disposed between the first substrate 130A and the second substrate 130B, in which a value of a refractive power of each lens line 31 thereof is changed by a voltage which is applied between the first electrode and the second electrode. In addition, the reference numeral 138 represents the sealing portion between the first substrate 130A and the second substrate 130B.

The variable lens array 30 is disposed to face the front side (image viewer side) of the image display section 10, and is held by a holding member, which is not shown, so as to face the image display section 10 with a predetermined space, which is set on the basis of design, interposed therebetween. As described later, wall-shaped spacers are provided in a place, in which an orientation direction of liquid crystal molecules of the liquid crystal layer is unchanged when the value of the refractive power of each lens line 31 thereof is changed, between the first substrate 130A and the second substrate 130B of the variable lens array 30. In the first embodiment, the columnar spacers are disposed at the center portions of the lens lines 31.

An illumination section 20, which illuminates light, is disposed on the rear side of the image display section 10. The illumination section 20 is constituted by members (which are not shown in the drawing) such as a light source, a prism sheet, a diffusion sheet, and a light guide plate.

A first polarization film not shown in the drawing is attached to the rear surface side of the image display section 10 so as to make the polarization direction be the X direction, and a second polarization film is attached to the front surface side of the image display section 10 so as to make the polarization direction be the Y direction. By causing a driving circuit not shown in the drawing to drive the image display section 10 so as to control the orientation directions of liquid crystal molecules within pixels, a two-dimensional image based on a video signal transmitted from the outside is displayed. Further, in the case of displaying a stereoscopic image and the case of displaying a normal image by causing the separate driving circuit not shown in the drawing to drive the variable lens array 30, the values of the refractive powers of the lens lines 31 are respectively set to predetermined values.

In a display area 11 of the image display section 10, M pixels 12 are arranged in the horizontal direction (in the X direction in the drawing), and N pixels 12 are arranged in the vertical direction (in the Y direction in the drawing). The m-th (where m=1, 2 . . . , M) pixel 12 is represented as a pixel $12_m$.

In the variable lens array 30, P lens lines (variable lens line) 31 extending in the vertical direction are arranged in the horizontal direction. The p-th (where p=1, 2 . . . , P) lens line 31 is represented by a lens line $31_p$. The relationship between "P" and "M" mentioned above will be described.

For convenience of description, the number of points of view of an image at the time of displaying a stereoscopic image is 4 of the points of view A1, A2 . . . , and A4 in the central viewing area WAC, but this is just an example. The number of viewing areas and the number of points of view can be appropriately set on the basis of the design of the image display apparatus 1. By appropriately setting a positional relationship between the image display section 10 and the lens line 31 and the like, even in the left side area $WA_K$ and the right side area $WA_R$ of the central viewing area $WA_C$, an image for the respective points of view is visible.

Subsequently, referring to FIGS. 2 to 4, the configuration of the variable lens array 30 will be described.

Figure 2:
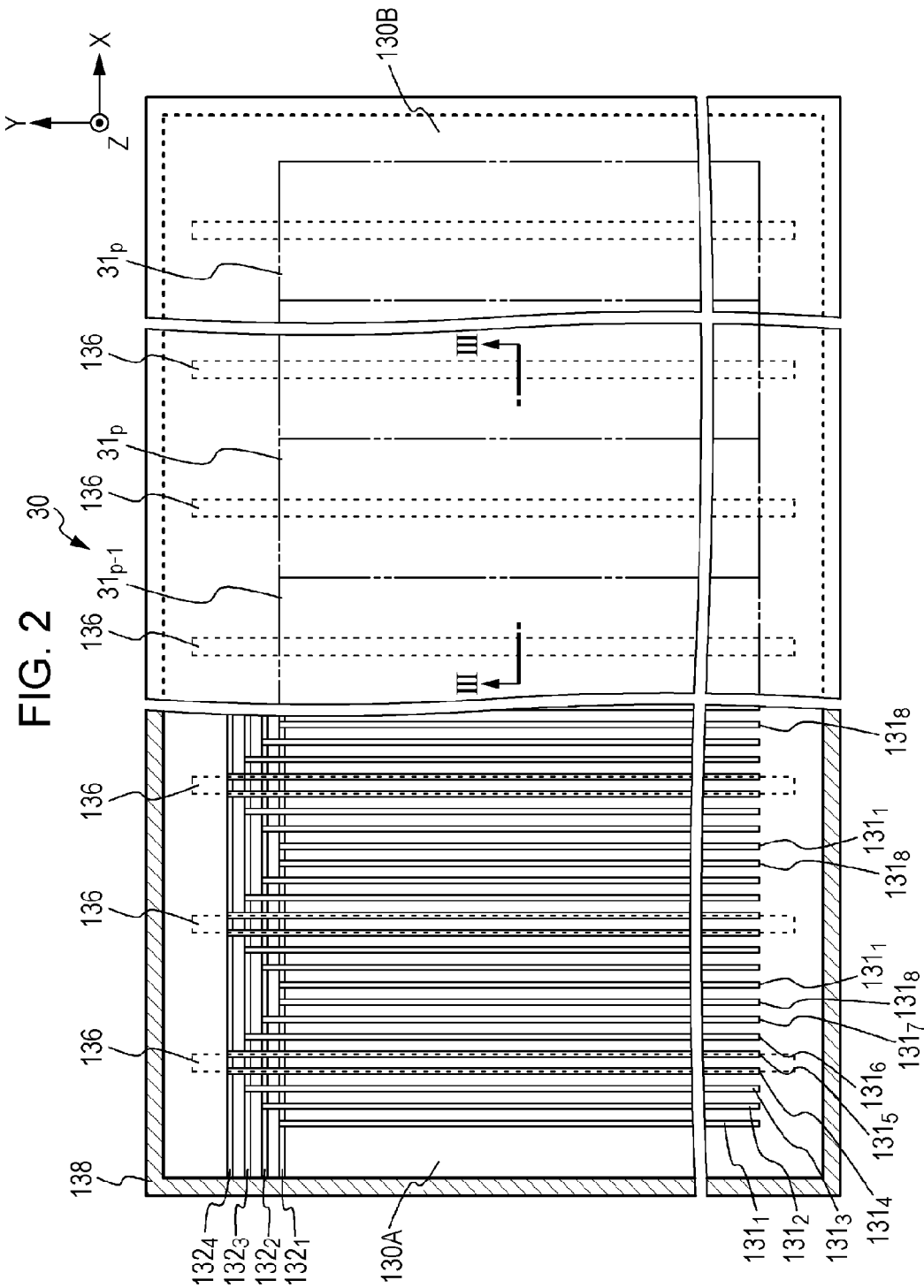
FIG. 2 is a schematic top plan view of the front side of a variable lens array.

FIG. 2 is a schematic top plan view of the front side of the variable lens array. A part of the second substrate 130B is cut and shown in FIG. 2. FIG. 3 is a schematic top plan view of the rear side of the variable lens array. A part of the first substrate 130A is cut and shown in FIG. 3. FIG. 4 is a sectional view taken along the IV-IV line of FIG. 2.

Figure 4:
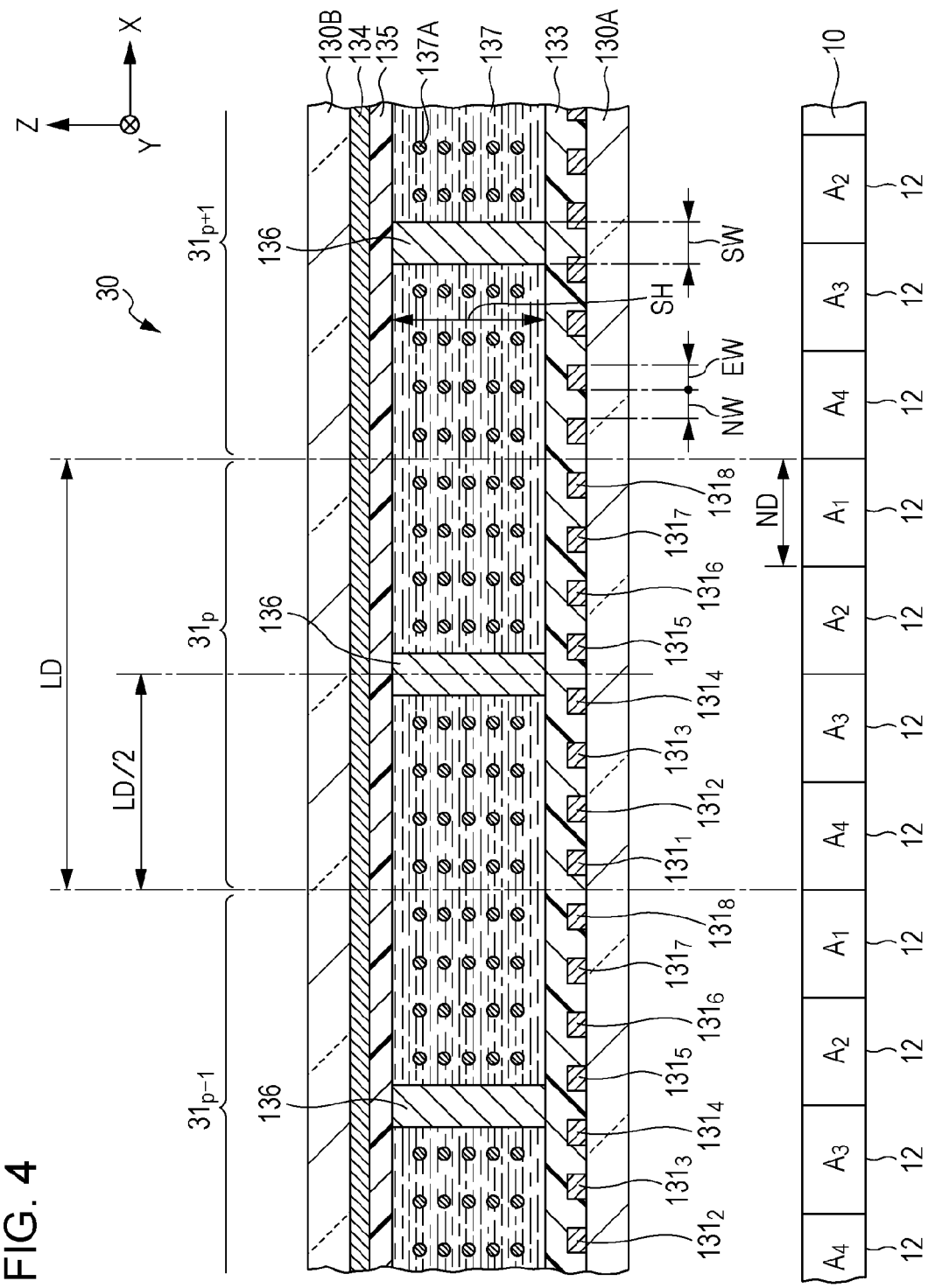
FIG. 4 is a sectional view taken along the IV-IV line of FIG. 2.

As shown in FIG. 4, the variable lens array 30 includes: the first substrate 130A that has first electrodes $131_1$, $131_2$ . . . , and $131_8$; the second substrate 130B that has a second electrode 134; a liquid crystal layer 137 that is disposed between the first substrate 130A and the second substrate 130B. In addition, the first electrodes $131_1$, $131_2$ . . . , and $131_8$ may be collectively represented by a first electrode 131. Other components are the same.

The first electrode 131 and the second electrode 134 are respectively formed on the surfaces (inner surfaces) of the first substrate 130A and the second substrate 130B on the liquid crystal layer 137 sides thereof. The liquid crystal layer 137 is formed of a positive nematic liquid crystal material.

The first electrode 131 and the second electrode 134 are formed of a transparent conductive material called ITO, and are formed by an existing film formation technique. The first electrode 131 is formed in a predetermined stripe shape shown in FIG. 2 by a patterning technique. The second electrode 134 constitutes a so-called common electrode, and is formed on the entire surface of the second substrate 130B. In addition, for convenience of illustration, in FIG. 3, the second electrode 134 and a second alignment film 135 to be described later are not illustrated. Further, in FIG. 2, a first alignment film 133 to be described later is also omitted.

As shown in FIG. 4, the first alignment film 133, which covers the entire surface including the first electrode 131, is formed on the first substrate 130A, and the second alignment film 135, which covers the entire surface including the second electrode 134, is formed on the second substrate 130B. Those are made of, for example, a polyimide material, and the rubbing process is performed on the surface thereof. The first alignment film 133 and the second alignment film 135 define the direction of the molecular axis of the liquid crystal molecules 137A in a state where electric field is not applied. The first alignment film 133 and the second alignment film 135 are subjected to the alignment process of orienting the major axis of the liquid crystal molecules 137A to the Y direction in the state where electric field is not applied, and tilting the major axis to the Z direction when electric field is applied. In addition, FIG. 4 shows the orientation of the liquid crystal molecules 137A when electric field is not applied. A predetermined voltage is applied from the driving circuit, which is not shown in the drawing, to the second electrode 134.

One lens line 31 basically corresponds to the four-line pixels 12. When the pitches of the lens line 31 and the pixel 12 in the horizontal direction are respectively represented by the sign LD and the sign ND, LD≈4×ND. For example, assuming that the pixel pitch ND is 0.3 [mm], the pitch LD of the lens line 31 is about 1.2 [mm]. Further, the above-mentioned "P" and "M" satisfy the relationship of P≈M/4.

As shown in FIGS. 2 and 4, in the area constituting one lens line 31, the first electrodes $131_2$, $131_2$ ..., and $131_8$, which have a stripe shape extending in the vertical direction, are arranged. As shown in FIG. 4, the first electrodes 131 are arranged in the horizontal direction with predetermined spaces NW interposed therebetween. The sign EW represents the width of the first electrode 131 in the horizontal direction. The lens line pitch LD, the space NW, and the width EW satisfy the relationship of LD=8×(NW+EW). In addition, the number of the first electrodes 131 corresponding to one lens line 31 is not limited to 8, and may be appropriately set on the basis of the design of the variable lens array 30. The values of the space NW and width EW are not particularly limited, and may be set to, for example, an appropriate value in consideration of the patterning technique.

As shown in FIG. 2, feeder wires $132_1$, $132_2$ ..., $132_4$, which have a stripe shape extending in the horizontal direction, are further provided on the first substrate 130A. The feeder wires $132_1$ to $132_4$ are formed in basically the same manufacturing process as the first electrodes 131. The first electrodes $131_1$ and $131_8$ are connected to the feeder wire $132_1$, and the first electrodes $131_2$ and $131_7$ are connected to the feeder wire $132_2$. Further, the first electrode $131_3$ and $131_6$ are connected to the feeder wire $132_3$, and the first electrodes $131_4$ and $131_5$ are connected to the feeder wire $132_4$. In addition, in FIG. 2, the contact of the feeder wire 132 and the electrode 131 are not illustrated.

As can be clearly seen from the above-mentioned connection relationship, the voltage of the first electrodes $131_1$ and $131_8$ is controlled by the voltage which is applied to the feeder wire $132_1$, and the voltage of the first electrodes $131_2$ and $131_7$ is controlled by the voltage which is applied to the feeder wire $132_2$. Further, the voltage of the first electrodes $131_3$ and $131_6$ is controlled by the voltage which is applied to the feeder wire $132_3$, and the voltage of the first electrodes $131_4$ and $131_5$ is controlled by the voltage which is applied to the feeder wire $132_4$. The independent voltages are respectively applied from the driving circuit, which is not shown in the drawing, to the feeder wires $132_1$, $132_2$ ..., and $132_4$.

Figure 3:
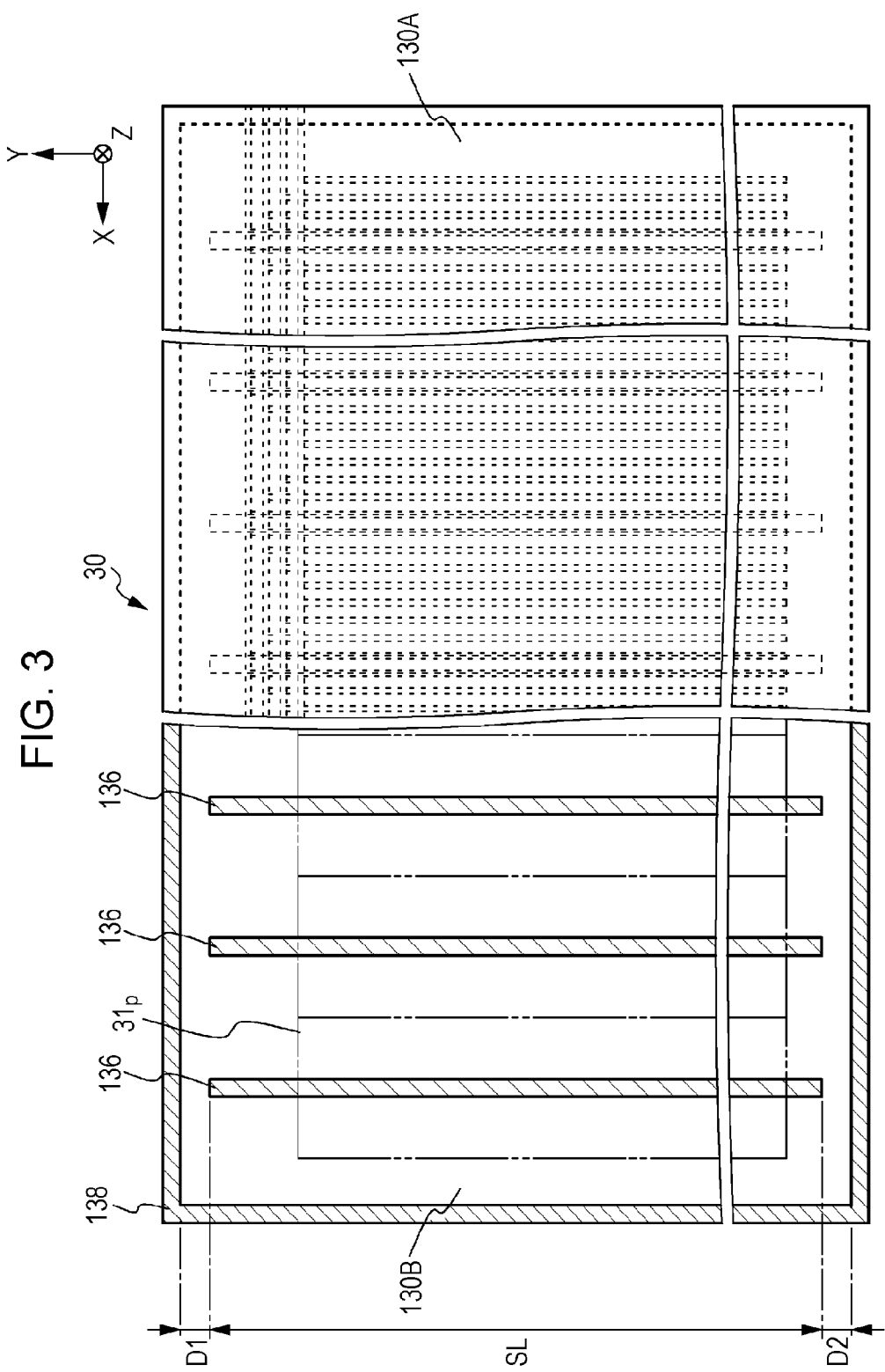
FIG. 3 is a schematic top plan view of the rear side of the variable lens array.

Further, as shown in FIGS. 3 and 4, in the area constituting one lens line 31, a wall-shaped spacer 136, which extends in the vertical direction, is disposed.

The spacers 136 are provided at prescribed locations on the second alignment film 135 of the second substrate 130B. The spacers 136 are formed of a transparent polymeric material, and are formed by exposing and developing a material layer for forming spacers provided on the second alignment film 135 and having photosensitivity.

In the first embodiment, the spacers 136 are provided on the second alignment film 135 at the positions of the center portions of the lens lines 31. With respect to the line passing through the center of the spacer 136, the first electrodes $131_1$ and $131_8$ are disposed to be symmetric, and the first electrodes $131_2$ and $131_7$ are disposed to be symmetric. Other first electrodes are the same.

In FIG. 4, the sign SW represents the width of the spacer 136 in the horizontal direction. Further, the sign SH represents the height of the spacer 136 in the Z direction. The width SW is, for example, 25 [μm], and the height SH is, for example, 50 [μm]. As shown in FIGS. 1 to 3, the outer peripheral portion of the first substrate 130A and the outer peripheral portion of the second substrate 130B are sealed by a sealing portion 138 which is formed of, for example, an epoxy-based resin material. The length SL of the spacer 136 shown in FIG. 3 is set as a value at which spaces D1 and D2 are provided between the end portions of the spacer 136 and the sealing portion 138. The values of the spaces D1 and D2 are set as values at which the liquid crystal material flows into the gap between the substrates without any problem at the time of manufacturing the variable lens array 30.

The method of manufacturing the variable lens array 30 will be described. The first electrodes 131, the first to fourth feeder wires, the first alignment film 133, and the like are appropriately formed on the first substrate 130A. Further, the second electrode 134, the second alignment film 135, the spacers 136, and the like are appropriately formed on the second substrate 130B. In addition, the first substrate 130A and the second substrate 130B subjected to the above-mentioned processes are made to face each other with the liquid crystal material interposed therebetween, and the periphery thereof is sealed, whereby it is possible to obtain the variable lens array 30.

Subsequently, referring to FIGS. 5 to 8, the operations of the variable lens array 30 will be described. First, the operation at the time of displaying a stereoscopic image will be described, and subsequently, the operation at the time of displaying a normal image will be described.

Figure 5:
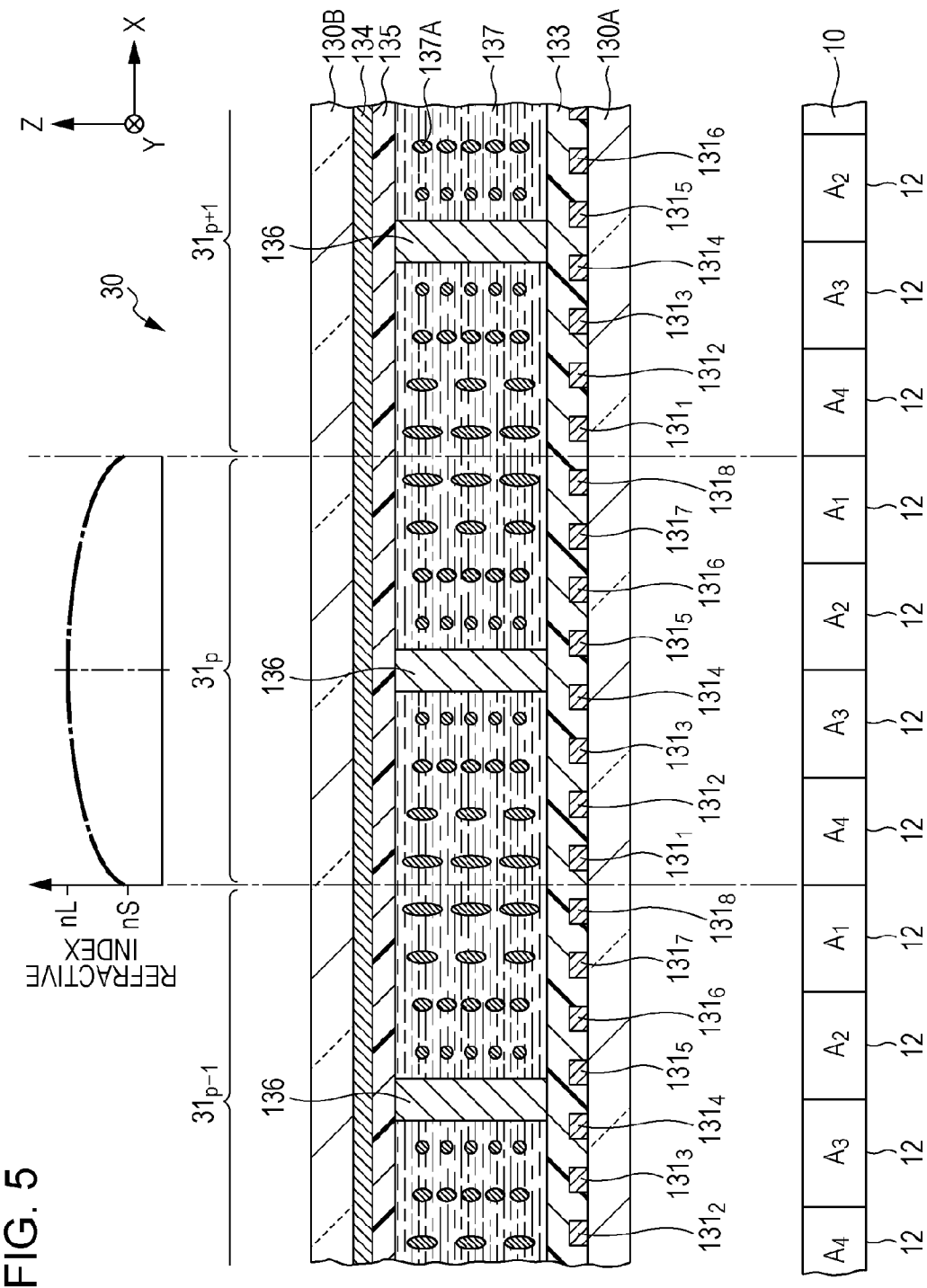
FIG. 5 is a schematic sectional view partially illustrating the variable lens array and an image display section when a stereoscopic image is displayed.
Figure 6:
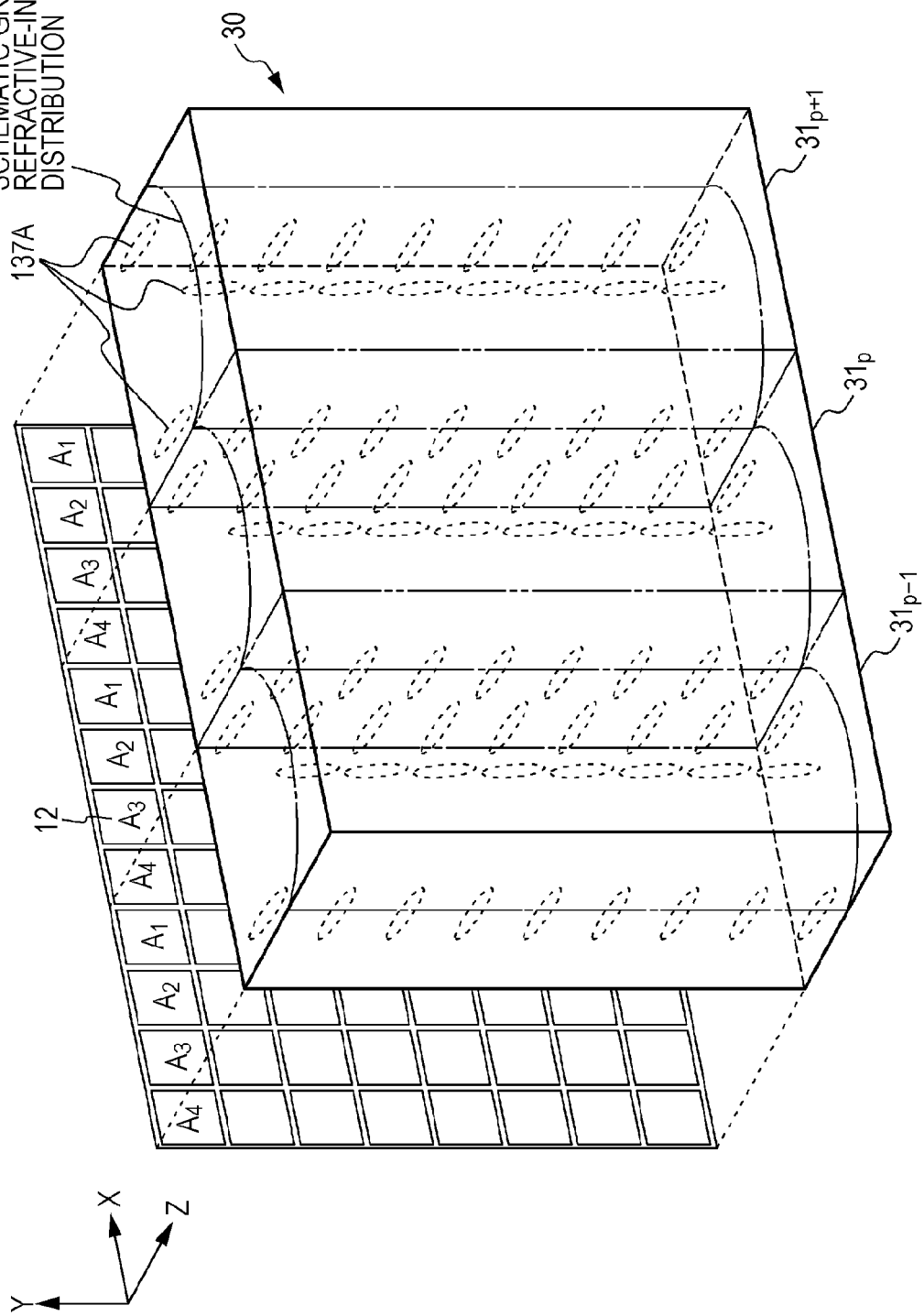
FIG. 6 is a schematic perspective view partially illustrating the image display section and the variable lens array.

FIG. 5 is a schematic sectional view partially illustrating the variable lens array and an image display section when a stereoscopic image is displayed. FIG. 6 is a schematic perspective view partially illustrating the image display section and the variable lens array.

At the time of operating the image display apparatus 1, for example, 0 [volt] is applied to the second electrode 134. Then, in the case of displaying a stereoscopic image, for example, 30 [volt] is applied to the feeder wire $132_1$, 20 [volt] is applied to the feeder wire $132_2$, 10 [volt] is applied to the feeder wire $132_3$, and 0 [volt] is applied to the feeder wire $132_4$.

In this state, the voltage between the second electrode 134 and the first electrodes $131_1$ and $131_8$, which are connected to the feeder wire $132_1$, is 30 [volt]. Accordingly, electric field is generated between the second electrode 134 and the first electrodes $131_1$ and $131_8$, and then the major axis of the liquid crystal molecules 137A is oriented to the Z direction. Further, the voltage between the second electrode 134 and the first electrodes $131_2$ and $131_7$, which are connected to the feeder wire $132_2$, is 20 [volt]. Accordingly, electric field, of which the intensity is smaller than that of the just generated electric field, is generated between the second electrode 134 and the first electrodes $131_2$ and $131_7$. The major axis of the liquid crystal molecules 137A is oriented to the Z direction, but the degree of the orientation is slightly low. The voltage between the second electrode 134 and the first electrodes $131_3$ and $131_6$, which are connected to the feeder wire $132_3$, is 10 [volt]. Accordingly, electric field is also generated between the second electrode 134 and the first electrodes $131_3$ and $131_6$, and then the major axis of the liquid crystal molecules 137A is oriented to the Z direction, but the degree of the orientation is further low.

On the other hand, the voltage between the second electrode 134 and the first electrodes $131_4$ and $131_5$, which are connected to the feeder wire $132_4$, is 0 [volt]. Accordingly, electric field is not generated between the second electrode 134 and the first electrodes $131_4$ and $131_5$, and then the major axis of the liquid crystal molecules 137A remains in the Y direction.

The liquid crystal layer 137 is formed of a positive nematic liquid crystal material. The refractive index of the liquid crystal molecules 137A in the major axis direction is larger than the refractive index thereof in the minor axis direction. Hence, as shown in the graph of FIG. 5, the refractive index of the liquid crystal layer 137 is small at the peripheral portion of the lens line 31, and the refractive index is larger at a position closer to the center portion. In addition, the sign "nS" and the sign "nL" shown in FIG. 5 respectively represent the refractive index of the liquid crystal molecules 137A in the minor axis direction and the refractive index thereof in the major axis direction. In addition, the graph shown in FIG. 5 is schematic, and thus it does not typically mean that the smallest value and the largest value of the refractive index are "nS" and "nL". It is the same for the graphs in other drawings to be described later.

In this state, the wavefront of the light transmitted through the lens line 31 propagates faster at a position closer to the peripheral portion than the center portion of the lens line 31. Accordingly, the light propagates such that the wavefront is concentrated at a certain point. Therefore, the lens line 31 constitutes a liquid crystal GRIN lens functioning as a convex lens. The lens lines 31 of the stripe shape shown in FIG. 6 are supposed to be optically the same as the cylindrical convex lens lines, and are thus operated as a lenticular lens. In addition, the graph of the refractive index shown in FIG. 5 and the like shows an exemplary case of selecting the material with the refractive index substantially the same as the refractive index of the major axis direction of the liquid crystal molecules 137A as the polymeric material forming the spacers 136. Further, in FIG. 6, FIG. 8, and the like to be described later, for convenience of illustration, the spacers 136 are omitted.

The propagation direction of the light, which is emitted from the pixels 12 for forming images for the points of view A1, A2 . . . , and A4, can be changed when the light is transmitted through the lens lines 31, and the light is oriented to the predetermined direction. Thereby, in the viewing area WA shown in FIG. 1, it is possible to view images for the predetermined points of view.

Figure 7:
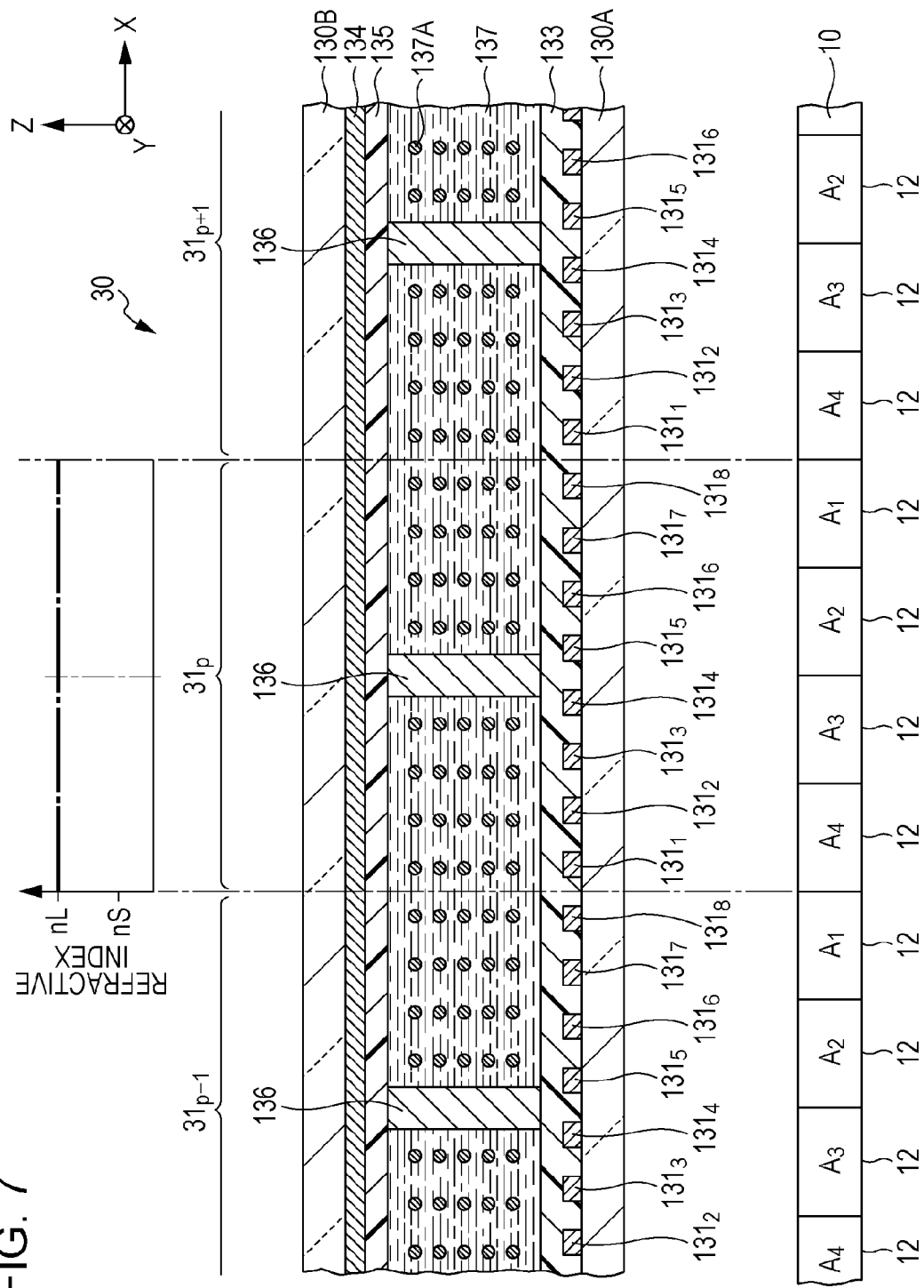
FIG. 7 is a schematic sectional view partially illustrating the variable lens array and an image display section when a normal image is displayed.
Figure 8:
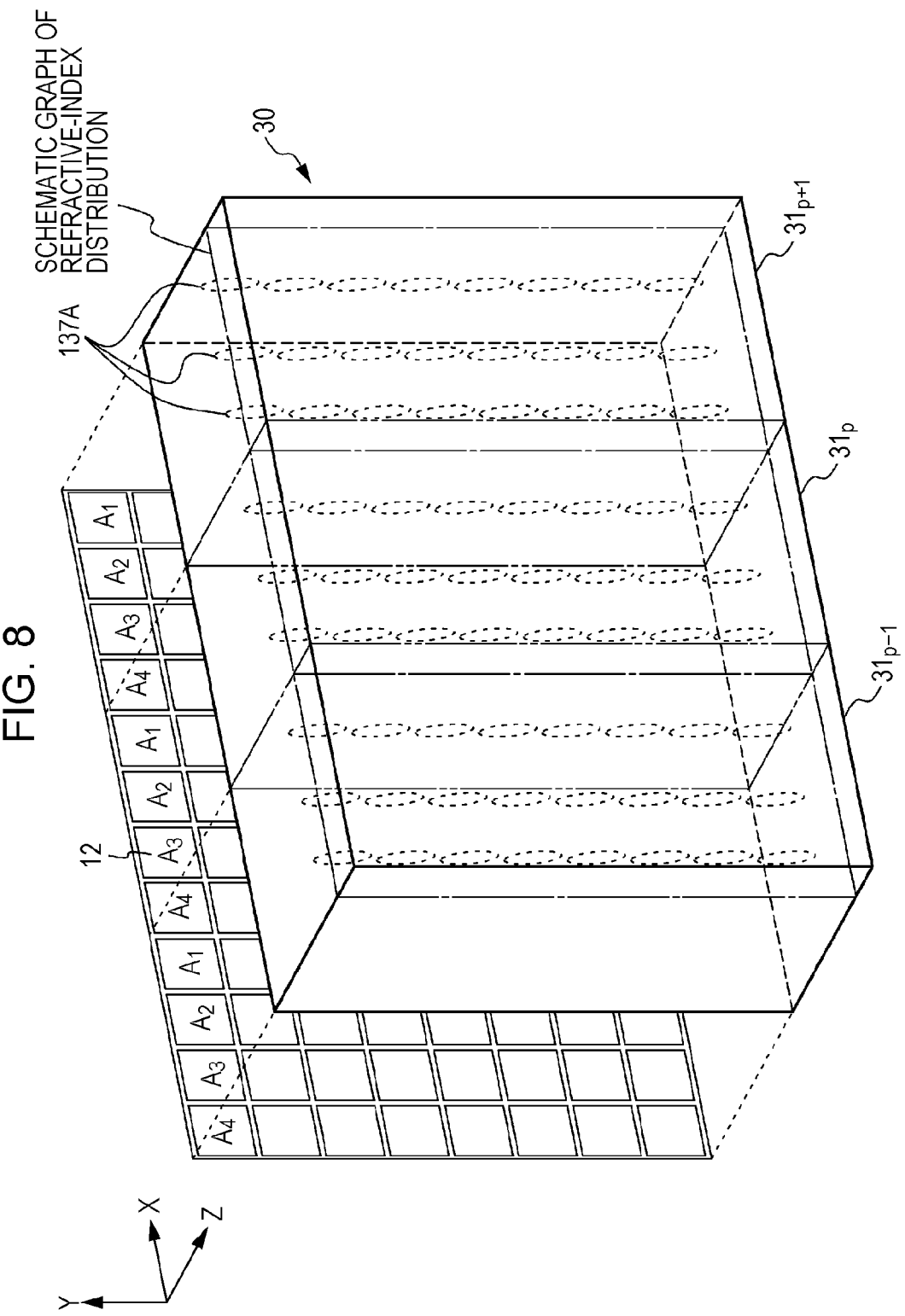
FIG. 8 is a schematic perspective view partially illustrating the image display section and the variable lens array.

FIG. 7 is a schematic sectional view partially illustrating the variable lens array and an image display section when a normal image is displayed. FIG. 8 is a schematic perspective view partially illustrating the image display section and the variable lens array.

When a normal image is displayed, for example, 0 [volt] is applied to the feeder wires $132_1$, $132_2$ . . . , and $132_4$. In this state, the voltage between the second electrode 134 and the first electrodes $131_2$, $131_2$ . . . , and $131_8$ is 0 [volt]. Accordingly, electric field is not generated between the second electrode 134 and all the first electrodes 131, and the major axis of the liquid crystal molecules 137A remains in the Y direction.

In this state, the liquid crystal layer 137 functions as a simple transparent substrate formed of a material of which the refractive index is "nL". In other words, the refractive power of the lens lines 31 having a stripe shape shown in FIG. 8 becomes small. Accordingly, the state of the image display apparatus 1 becomes similar to the state where the apparatus is not provided with the lens array, and thus it is possible to view a normal image.

As can be clearly seen from comparison between FIGS. 5 and 7, in the case of displaying a stereoscopic image and in the case of displaying a normal image, the orientation direction of the liquid crystal molecules 137A around the spacers 136 is kept constant. As described above, each spacer 136 is provided at a location where the liquid crystal molecules 137A of the liquid crystal layer 137 do not move when the value of the refractive power of the lens line 31 is changed. Accordingly, even when the spacer 136 has an influence on an initial orientation state of the liquid crystal molecules 137A around the spacer 136, this does not disturb an operation of orienting the liquid crystal molecules 137A by applying a voltage between the first electrodes 131 and the second electrode 134.

Further, when a material having a refractive index substantially the same as the refractive index of the liquid crystal molecules 137A in the major axis direction is selected as a polymeric material constituting the spacer 136, no matter what the refractive power of the variable lens array 30 is set, the spacers 136 are supposed to be optically the same as the liquid crystal layer 137. Accordingly, there is no loss in lens performance caused by presence of the spacers 136.

Figure 9:
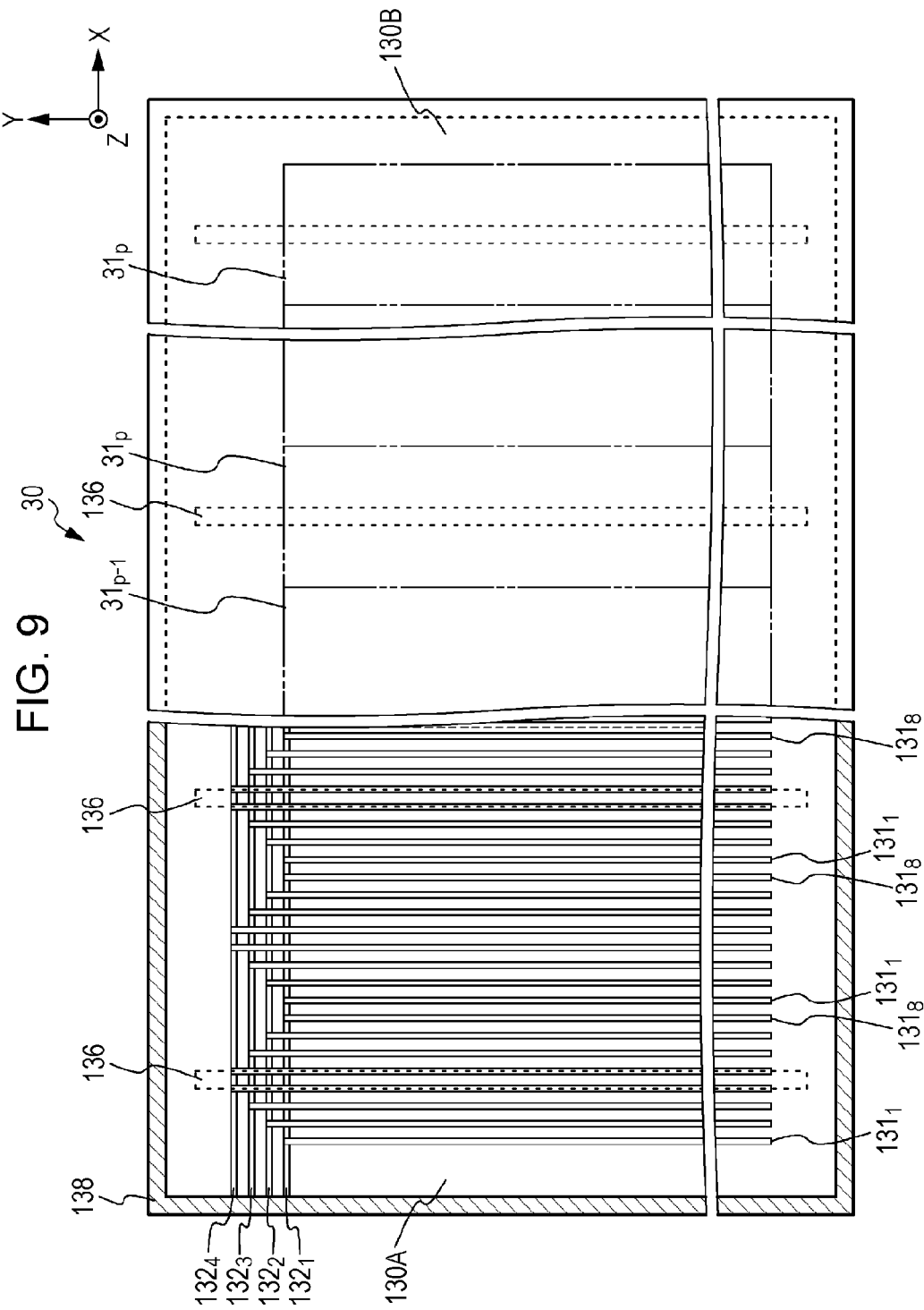
FIG. 9 is a schematic top plan view of the front side of a variable lens array of a first modified example.
Figure 10:
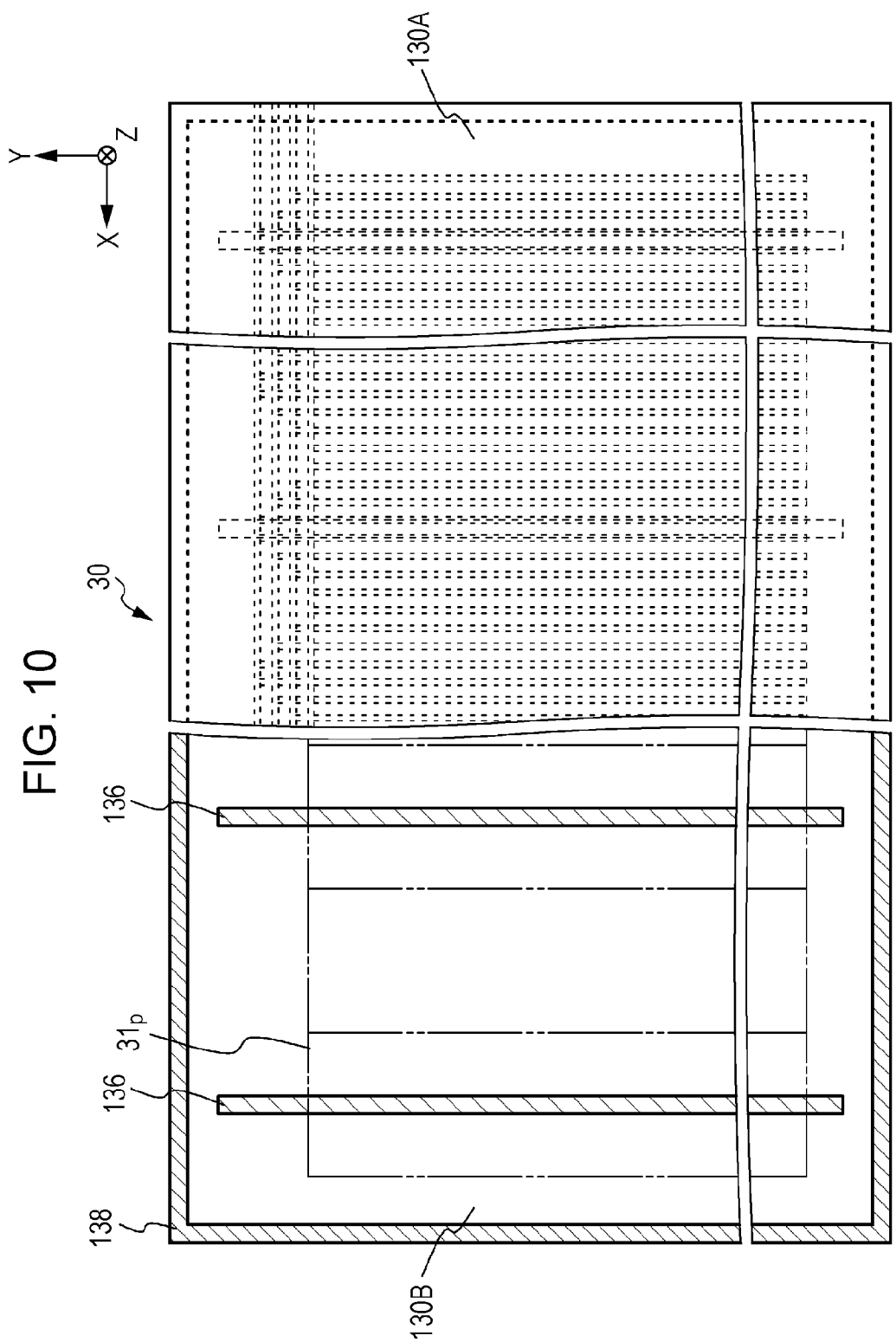
FIG. 10 is a schematic top plan view of the rear side of the variable lens array.

Hitherto, the first embodiment has been described. In the above description, the spacers 136 are provided at the center portions of the respective lens lines 31, but the present disclosure is not limited to this. For example, the lens lines 31, in which the spacers 136 are provided, and the lens lines 31, in which the spacers 136 are not provided, may be configured to be alternately arranged. It is the same for other embodiments to be described later. FIGS. 9 and 10 are schematic top plan views of the front side of the variable lens array and the rear side of the variable lens array according to such modified examples.

Figure 11:
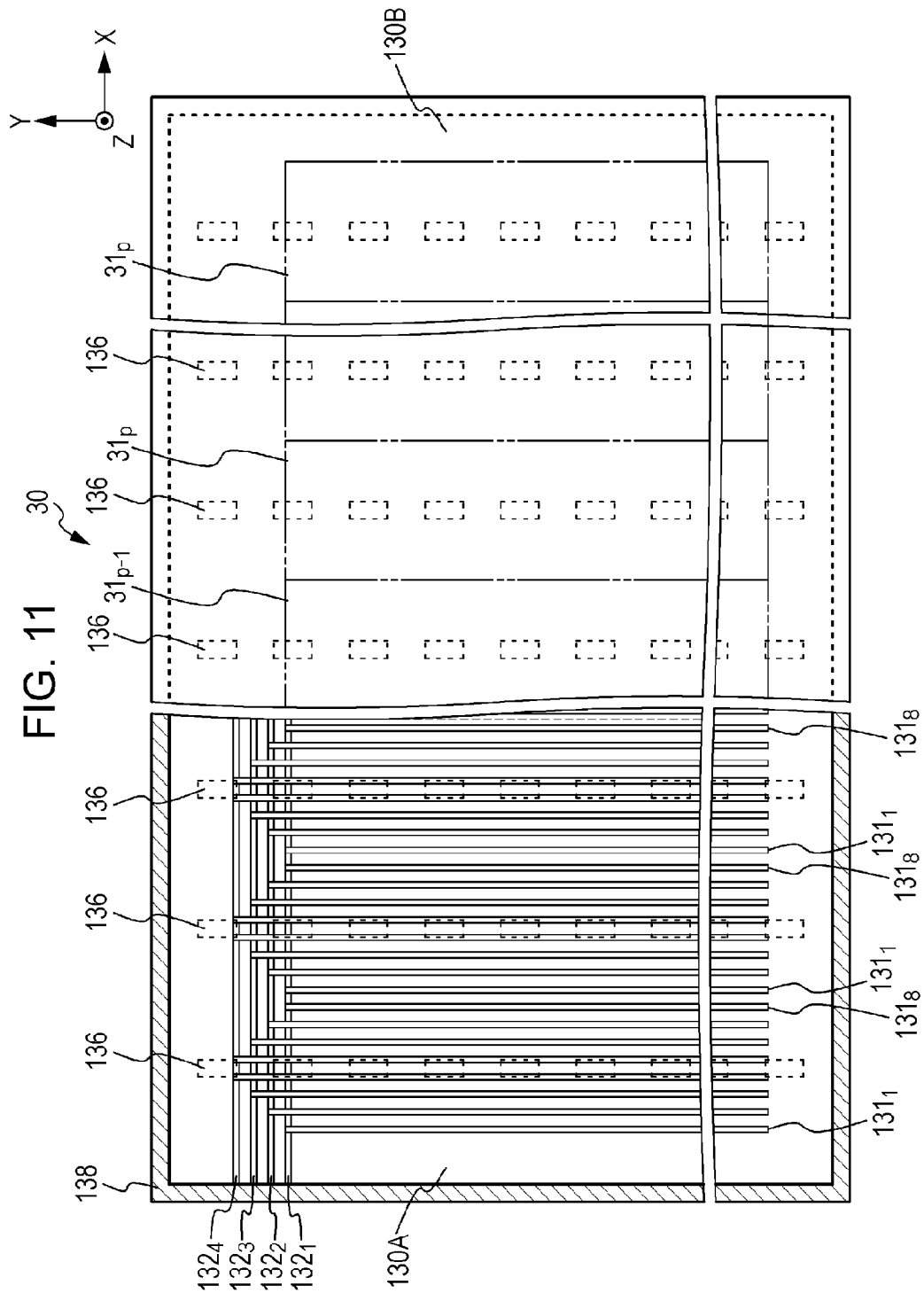
FIG. 11 is a schematic top plan view of the front side of a variable lens array of a second modified example.
Figure 12:
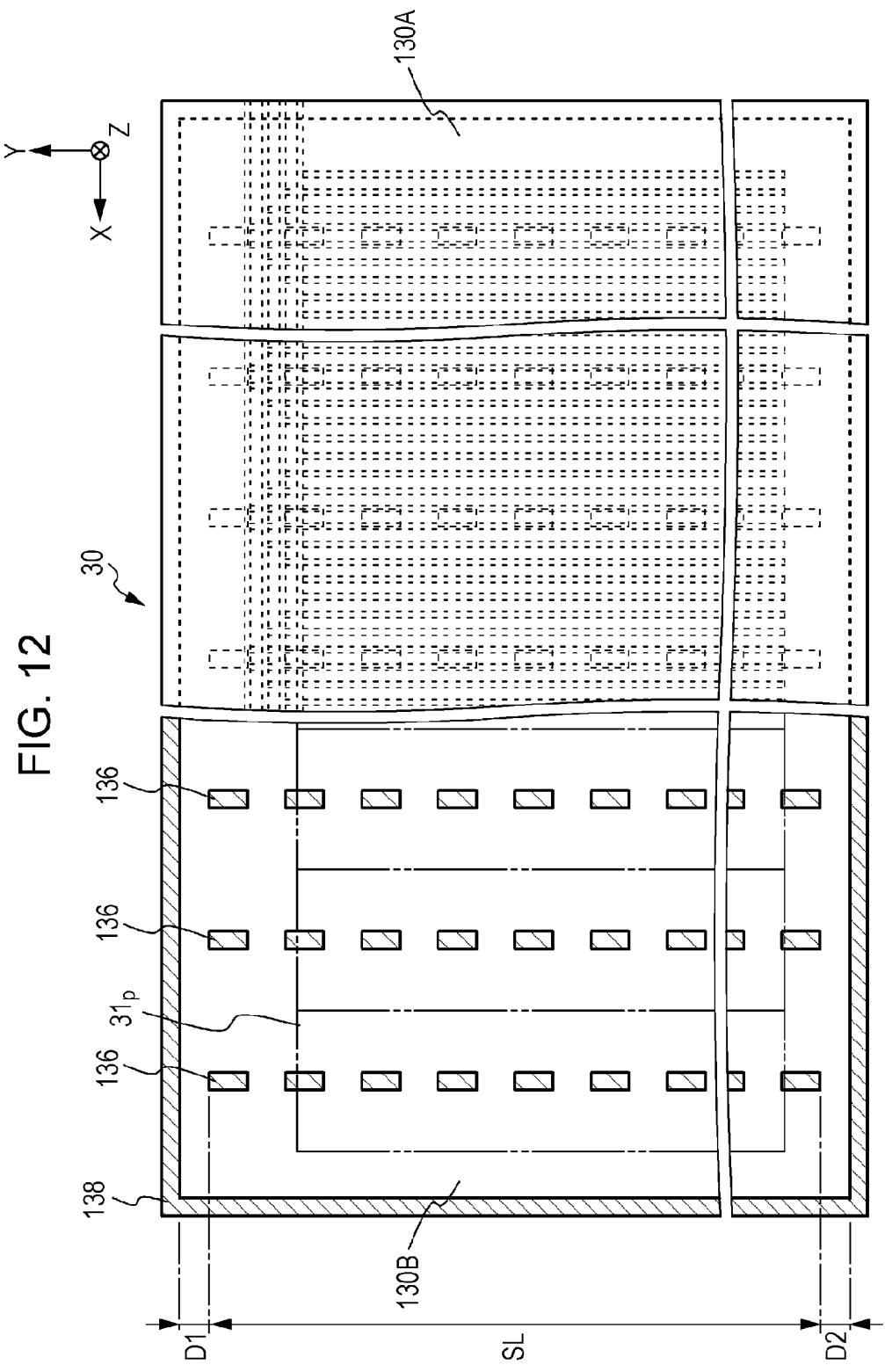
FIG. 12 is a schematic top plan view of the rear side of the variable lens array.

Alternatively, in the above description, each spacer 136 has a wall shape, but columnar spacers may be provided. It is the same for other embodiments to be described later. FIGS. 11 and 12 are schematic top plan views of the front side of the variable lens array and the rear side of the variable lens array according to such modified examples.

Second Embodiment

The second embodiment also relates to the image display apparatus and the variable lens array according to the present disclosure.

The second embodiment is different from the first embodiment in the positions of the spacers constituting the variable lens array and in the value of the voltage applied to the first electrodes at the time of displaying a normal image. The second embodiment has the same configuration as the first embodiment except the different points mentioned above.

In the schematic perspective view of an image display apparatus 2 according to the second embodiment when it is virtually disassembled, the image display apparatus 2 is indicated instead of the image display apparatus 1 shown in FIG. 1, and a variable lens array 230 is indicated instead of the variable lens array 30.

Figure 13:
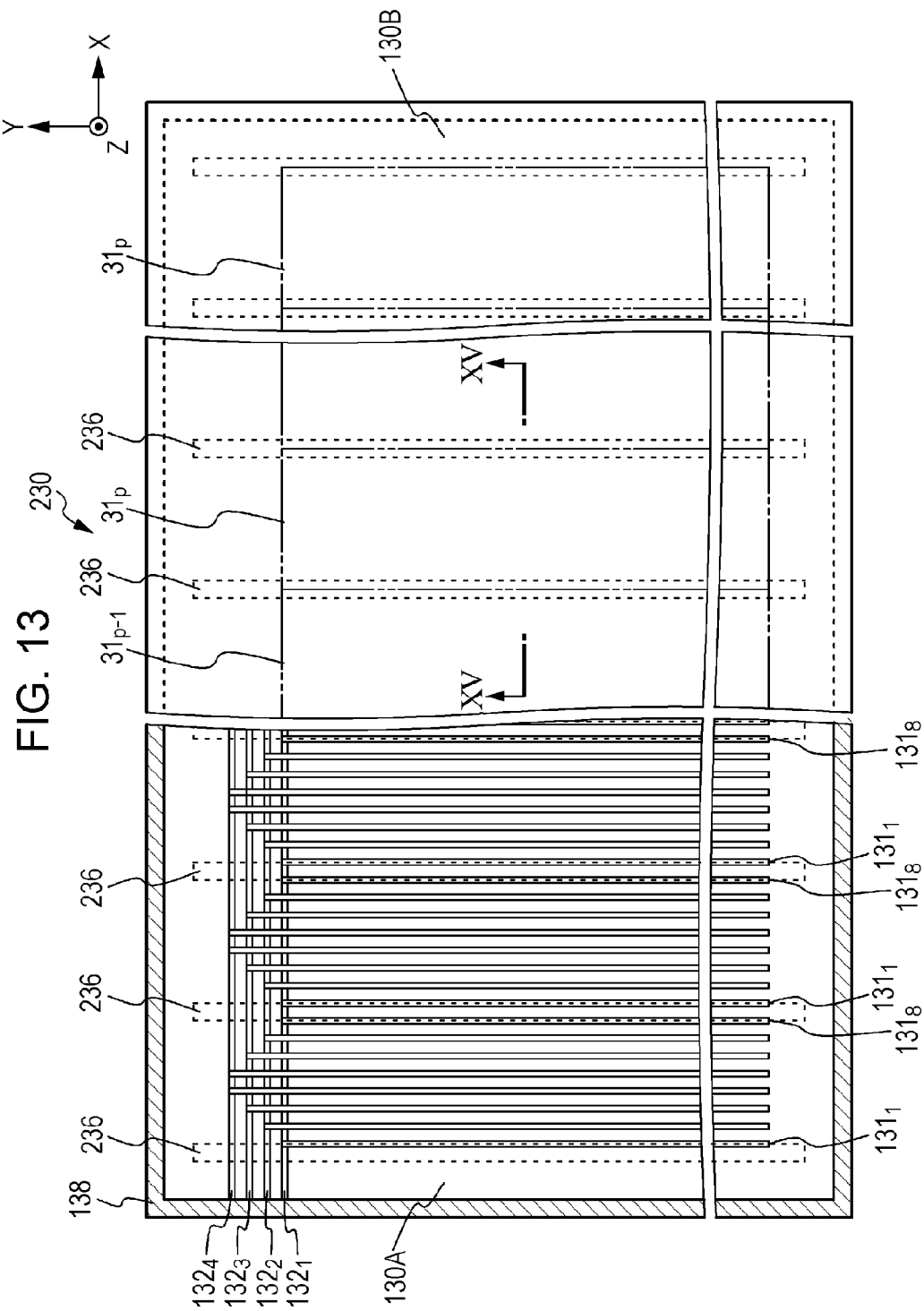
FIG. 13 is a schematic top plan view of the front side of a variable lens array according to a second embodiment.
Figure 14:
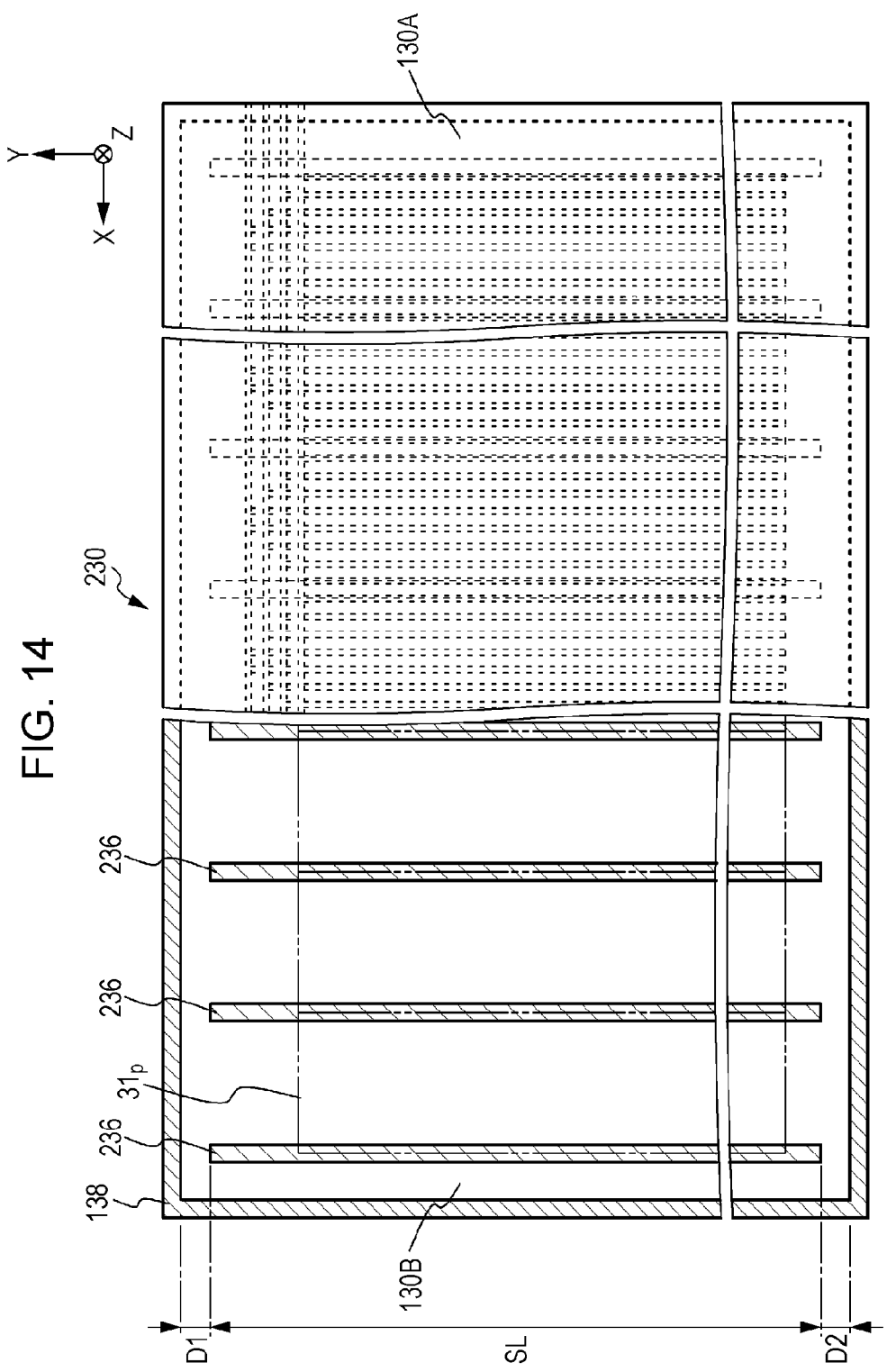
FIG. 14 is a schematic top plan view of the rear side of the variable lens array.
Figure 15:
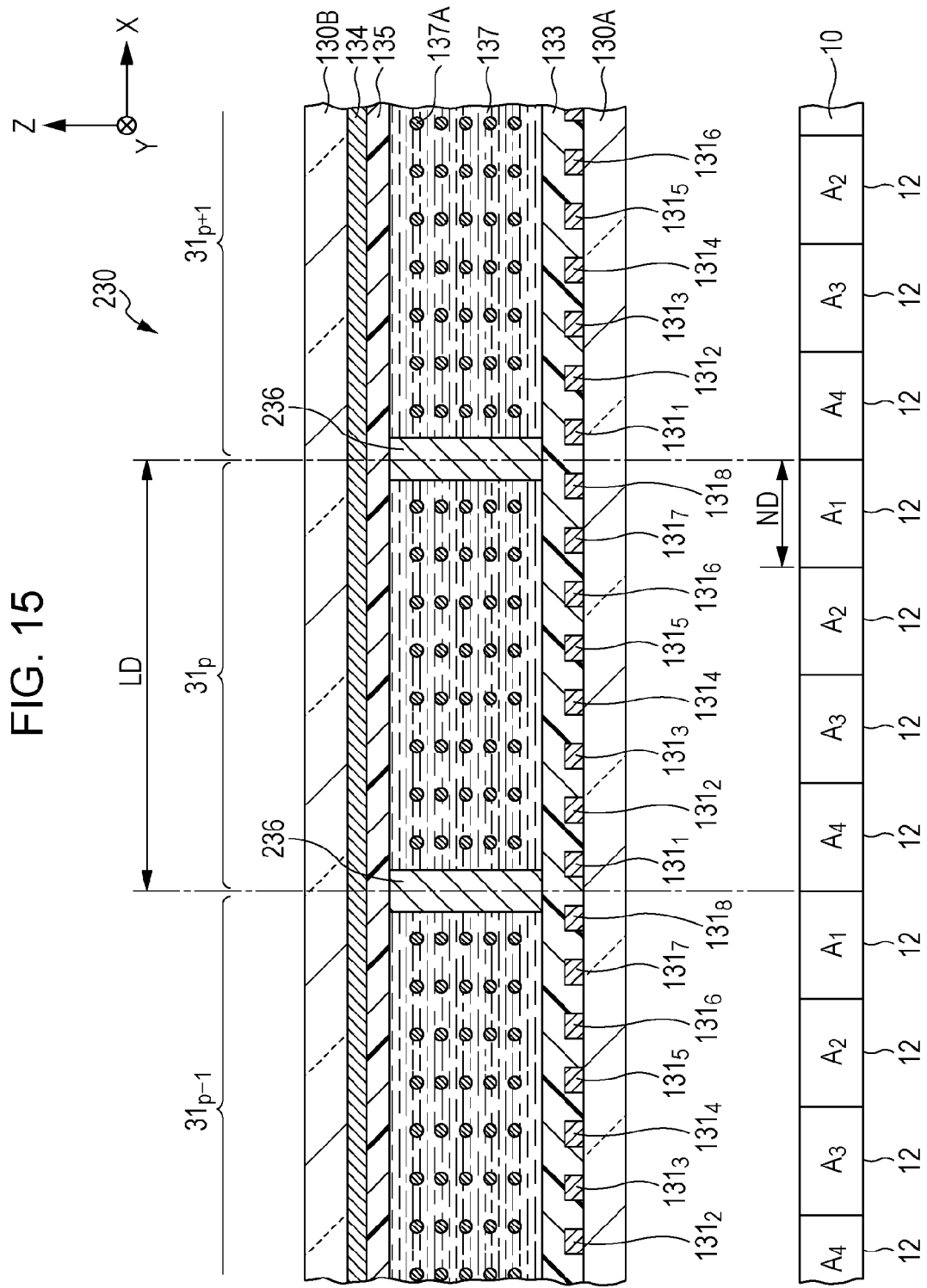
FIG. 15 is a sectional view taken along the XV-XV line of FIG. 13.

Referring to FIGS. 13 to 15, a configuration of the variable lens array 230 will be described.

FIG. 13 is a schematic top plan view of the front side of the variable lens array. A part of the second substrate 130B is cut and shown in FIG. 13. FIG. 14 is a schematic top plan view of the rear side of the variable lens array. A part of the first substrate 130A is cut and shown in FIG. 14. FIG. 15 is a sectional view taken along the XV-XV line of FIG. 13.

As shown in FIGS. 13 to 15, in the variable lens array 230, each wall-shaped spacer 236 is disposed at the boundary portion between the lens line 31 and the lens line 31 adjacent thereto. That is, the spacers 236 are respectively disposed at the boundary portions between the adjacent lens lines 31.

In the second embodiment, description will be given under the assumption that the major axis of the liquid crystal molecules 137A is oriented to the Y direction when electric field is not applied. In addition, FIG. 15 shows the orientation of the liquid crystal molecules 137A when electric field is not applied.

Subsequently, referring to FIGS. 16 to 19, the operations of the variable lens array 230 will be described. First, the operation at the time of displaying a stereoscopic image will be described, and subsequently, the operation at the time of displaying a normal image will be described.

Figure 16:
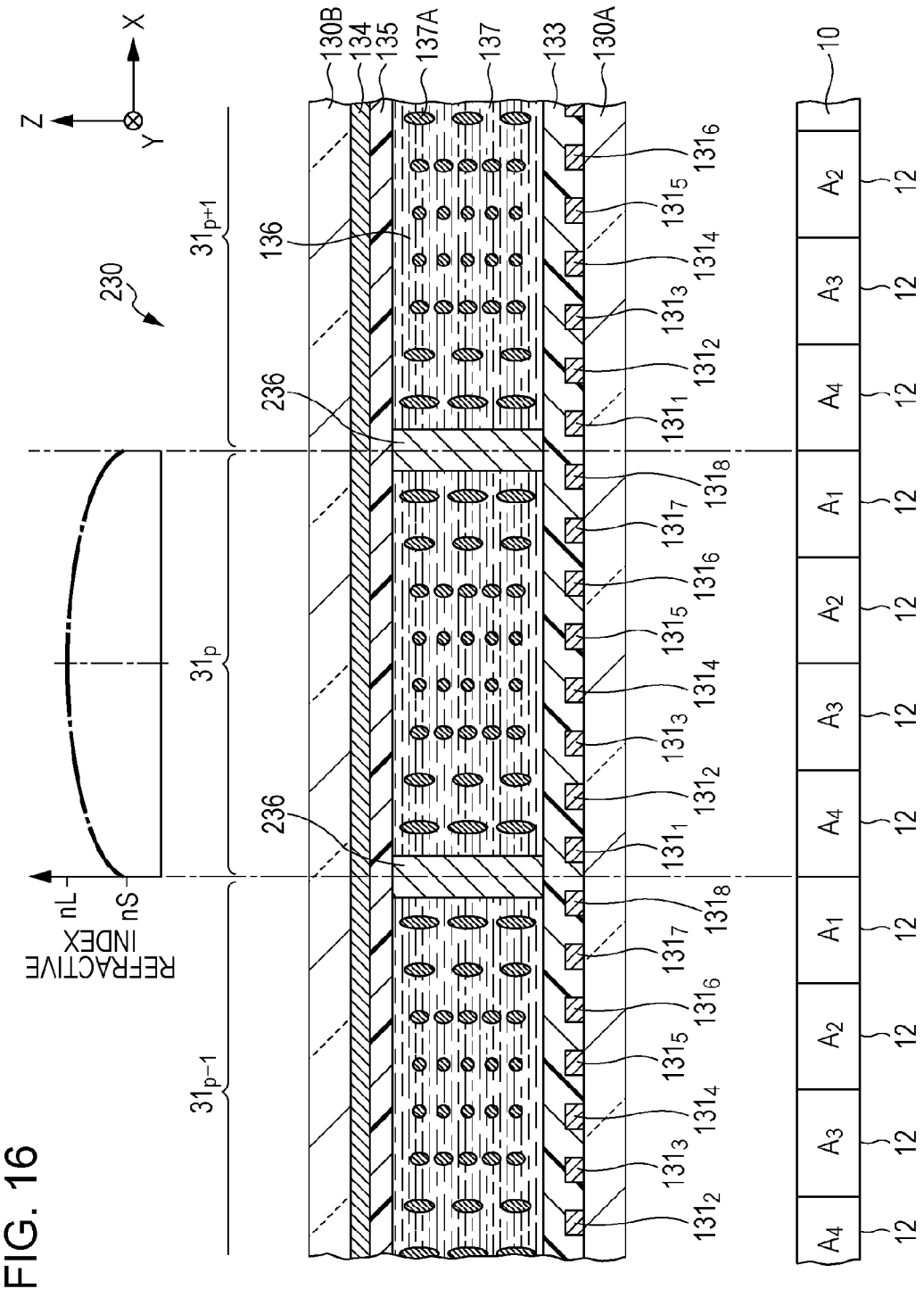
FIG. 16 is a schematic sectional view partially illustrating the variable lens array and an image display section when a stereoscopic image is displayed.
Figure 17:
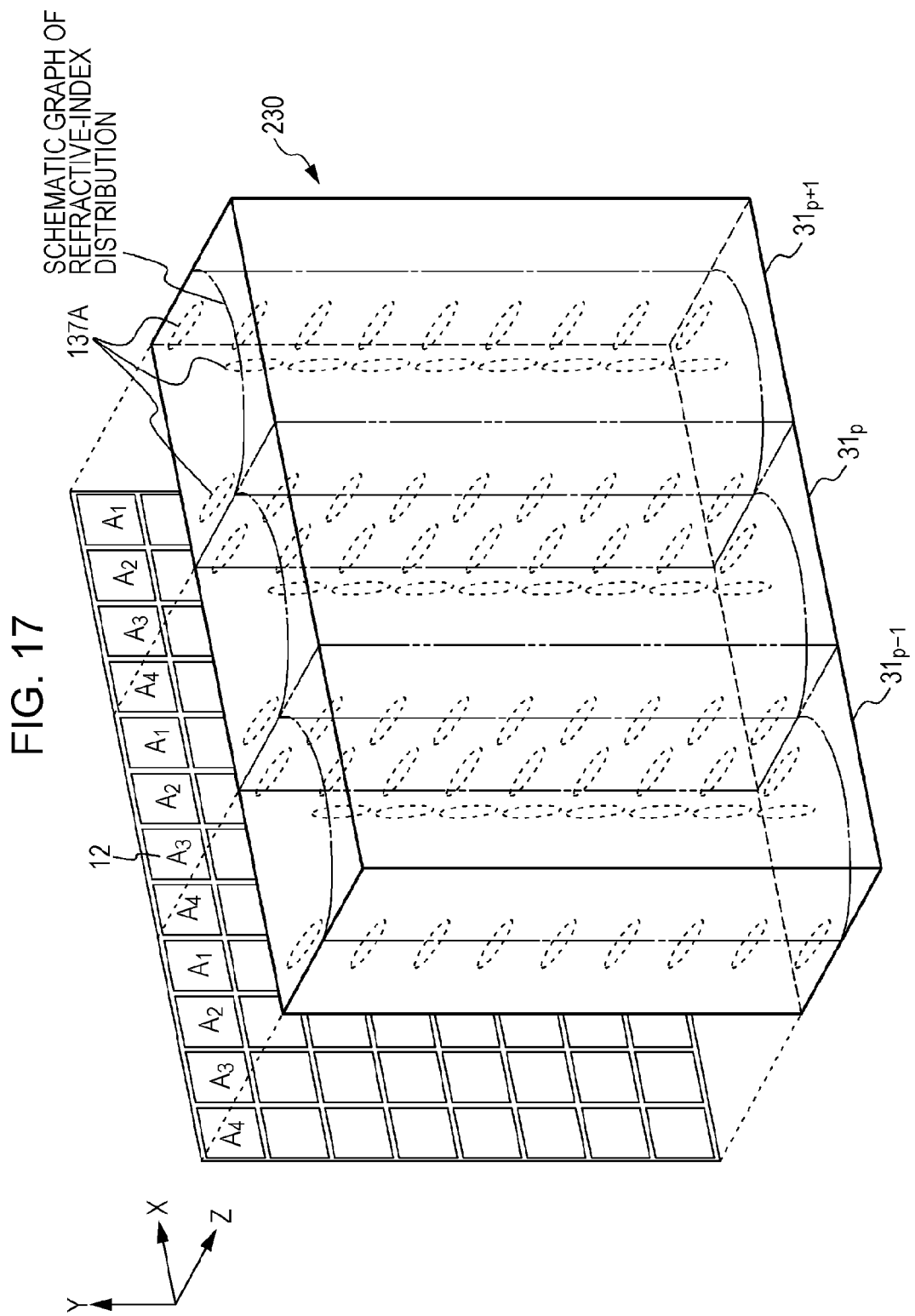
FIG. 17 is a schematic perspective view partially illustrating the image display section and the variable lens array.

FIG. 16 is a schematic sectional view partially illustrating the variable lens array and an image display section when a stereoscopic image is displayed. FIG. 17 is a schematic perspective view partially illustrating the image display section and the variable lens array.

At the time of operating the image display apparatus 2, for example, 0 [volt] is applied to the second electrode 134. Then, in the case of displaying a stereoscopic image, for example, 30 [volt] is applied to the feeder wire $132_2$, 20 [volt] is applied to the feeder wire $132_2$, 10 [volt] is applied to the feeder wire $132_3$, and 0 [volt] is applied to the feeder wire $132_4$.

The figure of the electric field, which is generated between the second electrode 134 and the first electrodes 131 in this state, is the same as that in the description which was given with reference to FIG. 5 in the first embodiment. The lens line 31 constitutes a liquid crystal GRIN lens functioning as a convex lens. The lens lines 31 of the stripe shape shown in FIG. 17 are supposed to be optically the same as the cylindrical convex lens lines, and are thus operated as a lenticular lens.

Figure 18:
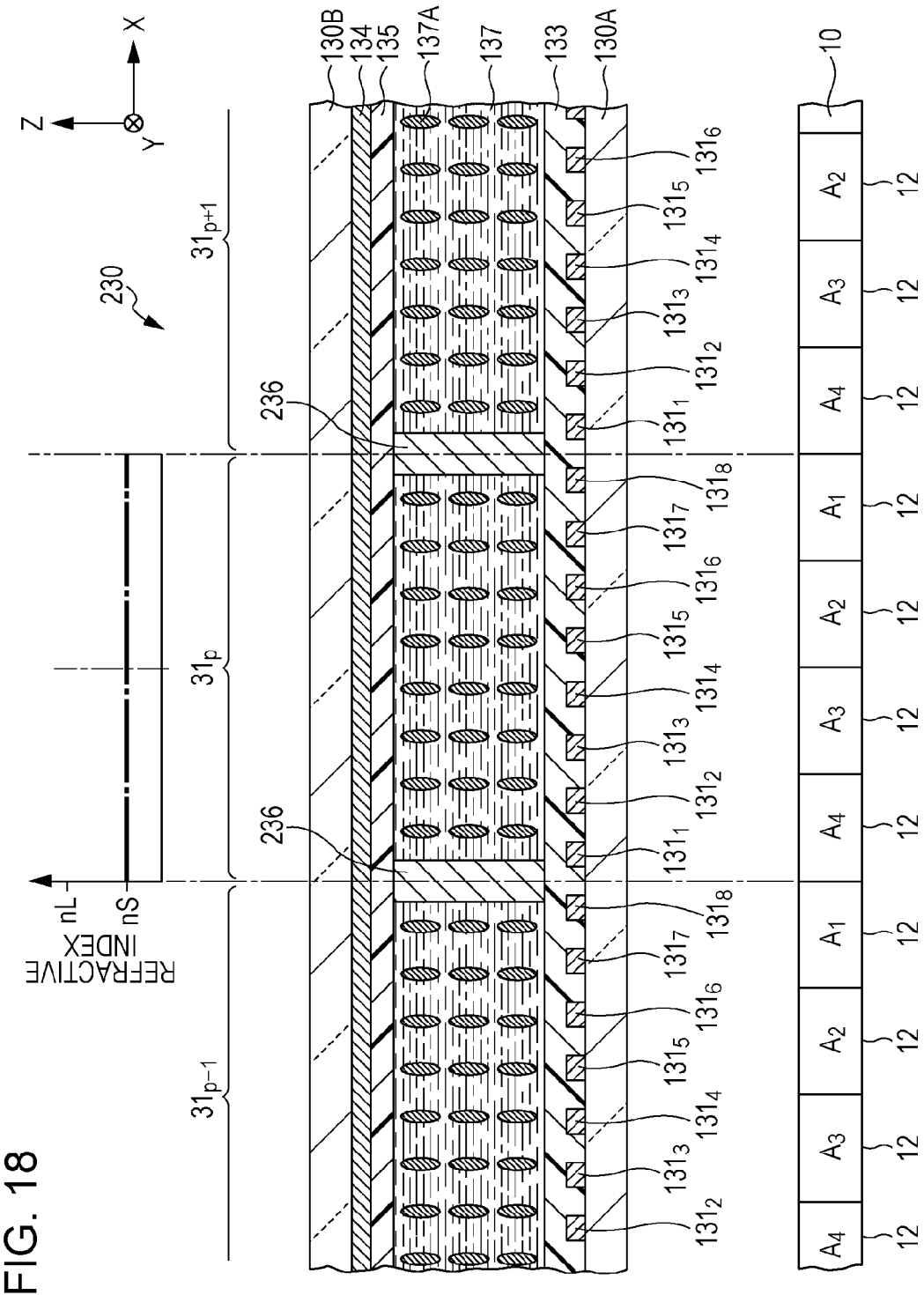
FIG. 18 is a schematic sectional view partially illustrating the variable lens array and an image display section when a normal image is displayed.
Figure 19:
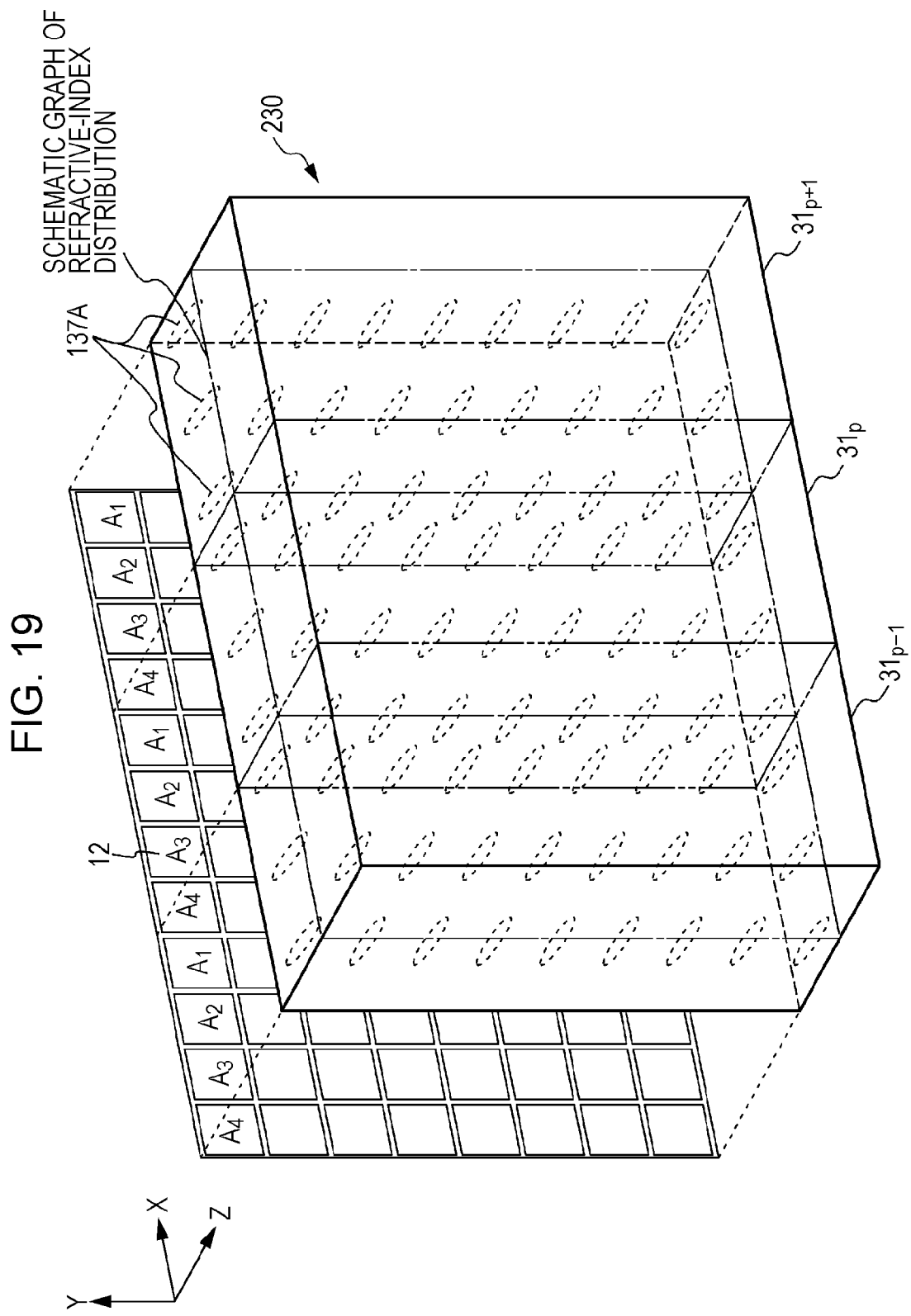
FIG. 19 is a schematic perspective view partially illustrating the image display section and the variable lens array.

FIG. 18 is a schematic sectional view partially illustrating the variable lens array and an image display section when a normal image is displayed. FIG. 19 is a schematic perspective view partially illustrating the image display section and the variable lens array.

When a normal image is displayed, for example, 30 [volt] is applied to the feeder wires $132_1$, $132_2$ . . . , and $132_4$. Electric field is generated between the second electrode 134 and all the first electrodes 131, and thus the major axis of the liquid crystal molecules 137A is oriented to the Z direction.

In this state, the liquid crystal layer 137 functions as a simple transparent substrate formed of a material of which the refractive index is "nS". In other words, the refractive power of the lens lines 31 shown in FIG. 19 becomes small. Accordingly, the state of the image display apparatus 2 becomes similar to the state where the apparatus is not provided with the lens array, and thus it is possible to view a normal image.

Third Embodiment

The third embodiment also relates to the image display apparatus and the variable lens array according to the present disclosure.

In the third embodiment, the liquid crystal layer of the variable lens array is formed of a negative nematic liquid crystal material. The third embodiment is different from the first embodiment in the alignment film and the liquid crystal material. The third embodiment has the same configuration as the first embodiment except the different points mentioned above.

In the schematic perspective view of an image display apparatus 3 according to the third embodiment when it is virtually disassembled, the image display apparatus 3 is indicated instead of the image display apparatus 1 shown in FIG. 1, and a variable lens array 330 is indicated instead of the variable lens array 30.

Figure 20:
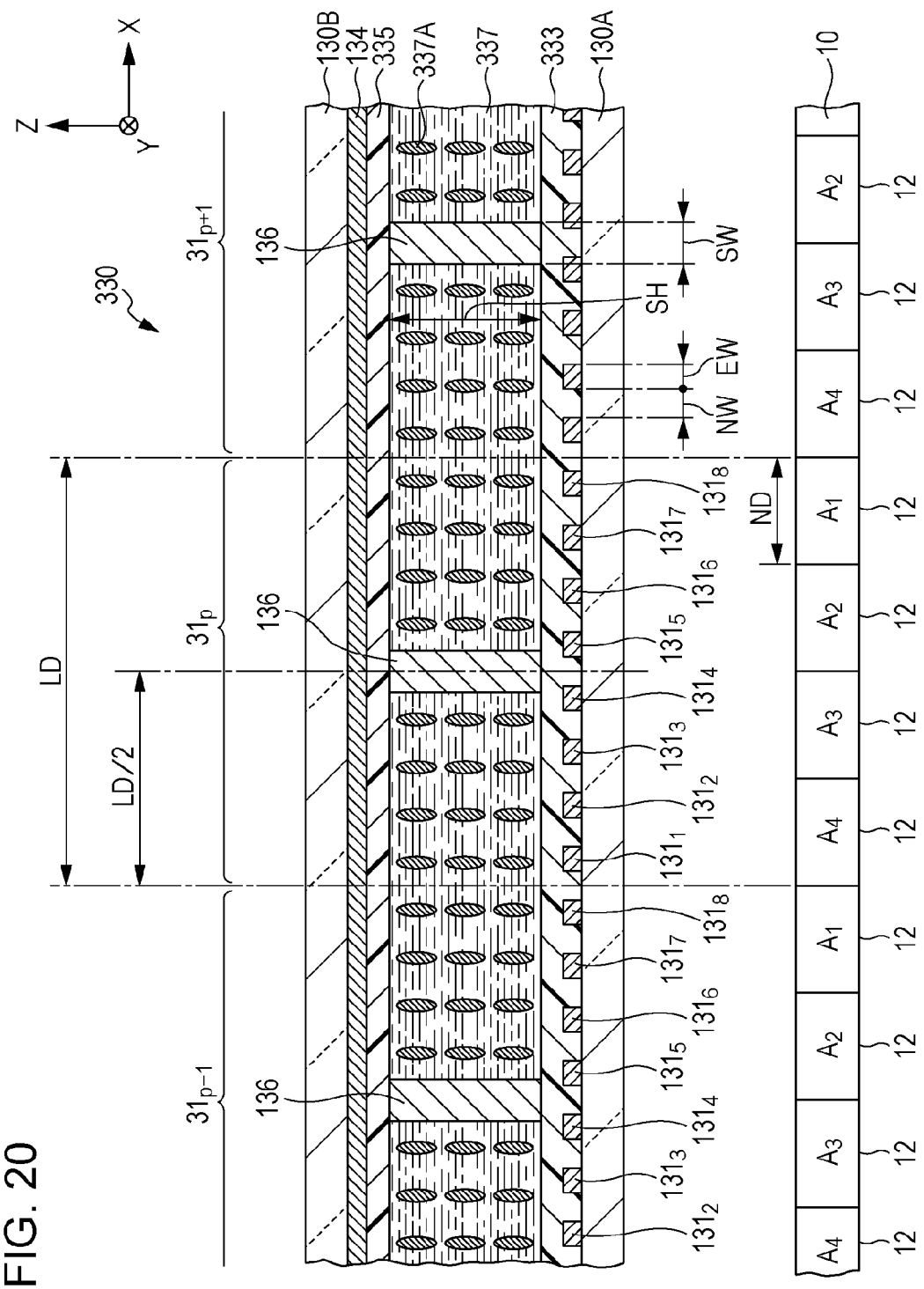
FIG. 20 is a sectional view partially illustrating a variable lens array according to a third embodiment.

FIG. 20 is a sectional view partially illustrating a variable lens array according to third embodiment. Specifically, FIG. 20 is a sectional view taken along the IV-IV line when the variable lens array 330 is indicated instead of the variable lens array 30 of FIG. 2 in the first embodiment.

As described above, in the variable lens array 330, the liquid crystal layer 337 is formed of a negative nematic liquid crystal material. In addition, contrary to the first embodiment, the first alignment film 333 and the second alignment film 335 are subjected to the alignment process of orienting the major axis of the liquid crystal molecules 337A to the Z direction in the state where electric field is not applied, and tilting the major axis to the Y direction when electric field is applied. In addition, FIG. 20 shows the orientation of the liquid crystal molecules 337A when electric field is not applied.

Subsequently, referring to FIGS. 21 to 24, the operations of the variable lens array 330 will be described. First, the operation at the time of displaying a stereoscopic image will be described, and subsequently, the operation at the time of displaying a normal image will be described.

Figure 21:
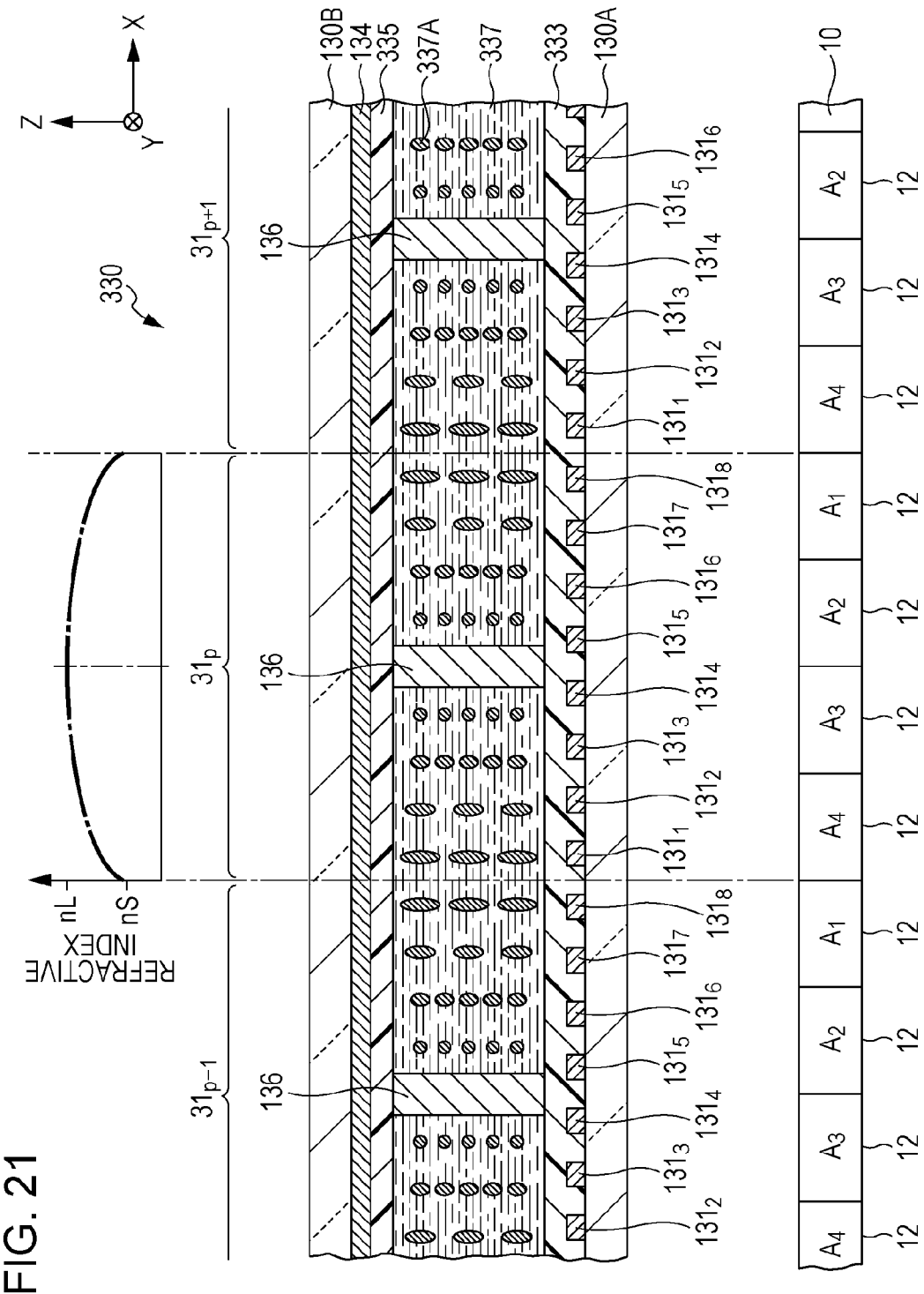
FIG. 21 is a schematic sectional view partially illustrating the variable lens array and an image display section when a stereoscopic image is displayed.
Figure 22:
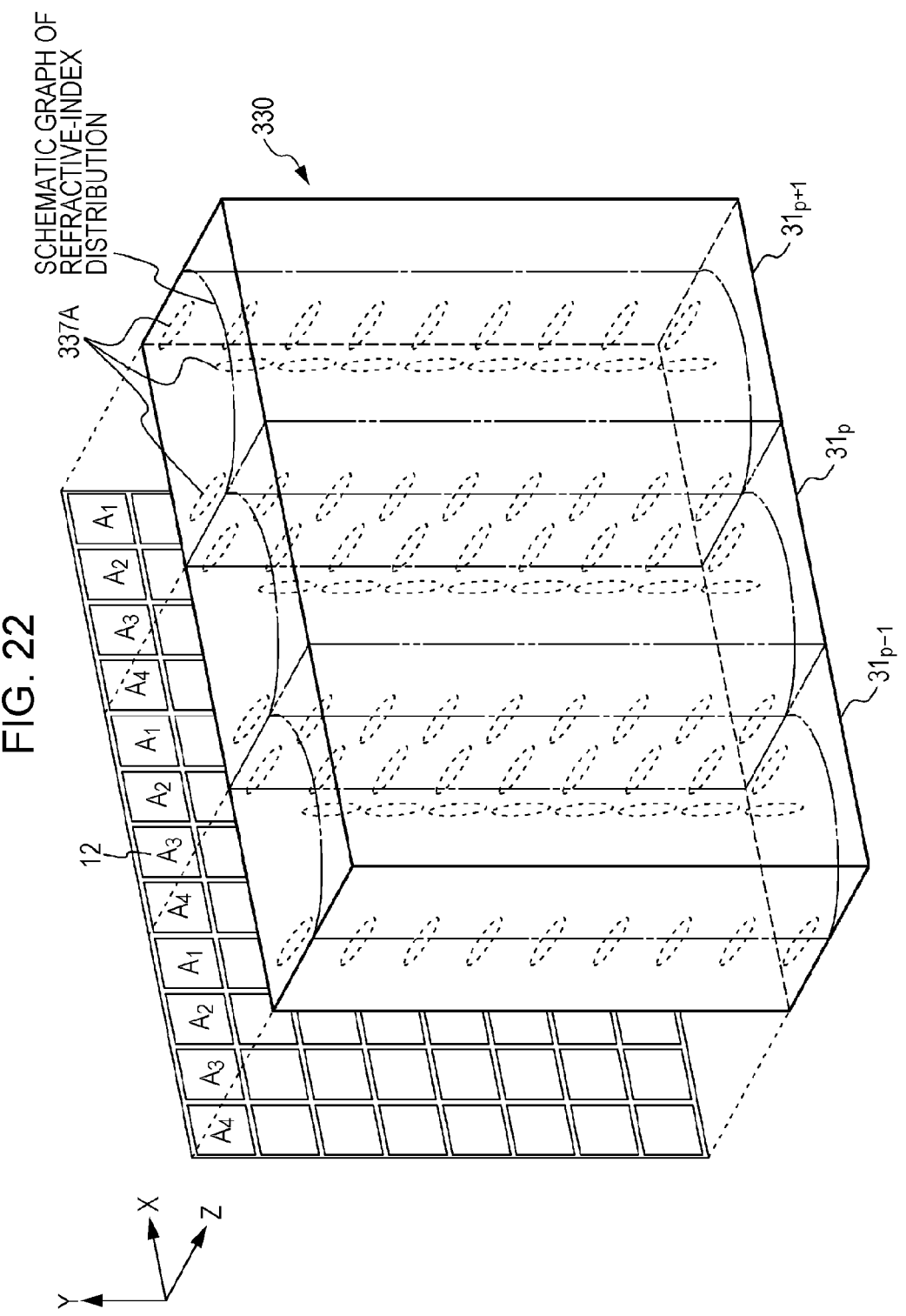
FIG. 22 is a schematic perspective view partially illustrating the image display section and the variable lens array.

FIG. 21 is a schematic sectional view partially illustrating the variable lens array and an image display section when a stereoscopic image is displayed. FIG. 22 is a schematic perspective view partially illustrating the image display section and the variable lens array.

At the time of operating the image display apparatus 3, for example, 0 [volt] is applied to the second electrode 134. Then, in the case of displaying a stereoscopic image, for example, 0 [volt] is applied to the feeder wire $132_1$, 10 [volt] is applied to the feeder wire $132_2$, 20 [volt] is applied to the feeder wire $132_3$, and 30 [volt] is applied to the feeder wire $132_4$.

In this state, the voltage between the second electrode 134 and the first electrodes $131_4$ and $131_5$, which are connected to the feeder wire $132_4$, is 30 [volt]. Accordingly, electric field is generated between the second electrode 134 and the first electrodes $131_4$ and $131_5$, and then the major axis of the liquid crystal molecules 337A is oriented to the Y direction. Further, the voltage between the second electrode 134 and the first electrodes $131_3$ and $131_6$, which are connected to the feeder wire $132_3$, is 20 [volt]. Accordingly, electric field, of which the intensity is smaller than that of the just generated electric field, is generated between the second electrode 134 and the first electrodes $131_3$ and $131_6$. The major axis of the liquid crystal molecules 337A is oriented to the Y direction, but the degree of the orientation is slightly low. The voltage between the second electrode 134 and the first electrodes $131_2$ and $131_7$, which are connected to the feeder wire $132_2$, is 10 [volt]. Accordingly, electric field is also generated between the second electrode 134 and the first electrodes $131_2$ and $131_7$, and then the major axis of the liquid crystal molecules 337A is oriented to the Y direction, but the degree of the orientation is further low.

On the other hand, the voltage between the second electrode 134 and the first electrodes $131_2$ and $131_8$, which are connected to the feeder wire $132_1$, is 0 [volt]. Accordingly, electric field is not generated between the second electrode 134 and the first electrodes $131_1$ and $131_8$, and then the major axis of the liquid crystal molecules 337A remains in the Z direction.

The refractive index of the liquid crystal molecules 337A in the major axis direction is larger than the refractive index thereof in the minor axis direction. Hence, as shown in the graph of FIG. 21, the refractive index of the liquid crystal layer 337 is small at the peripheral portion of the lens line 31, and the refractive index is larger at a position closer to the center portion. In addition, the sign "nS" and the sign "nL" shown in FIG. 21 respectively represent the refractive index of the liquid crystal molecules 337A in the minor axis direction and the refractive index thereof in the major axis direction.

In this state, the lens line 31 constitutes a liquid crystal GRIN lens functioning as a convex lens. The lens lines 31 of the stripe shape shown in FIG. 22 are supposed to be optically the same as the cylindrical convex lens lines, and are thus operated as a lenticular lens. In addition, the graph of the refractive index shown in FIG. 21 and the like shows an exemplary case of selecting the material with the refractive index substantially the same as the refractive index of the major axis direction of the liquid crystal molecules 337A as the polymeric material forming the spacers 136.

The propagation direction of the light, which is emitted from the pixels 12 for forming images for the points of view A1, A2 . . . , and A4, can be changed when the light is transmitted through the lens lines 31, and the light is oriented to the predetermined direction. Thereby, in the viewing area WA shown in FIG. 1, it is possible to view images for the predetermined points of view.

Figure 23:
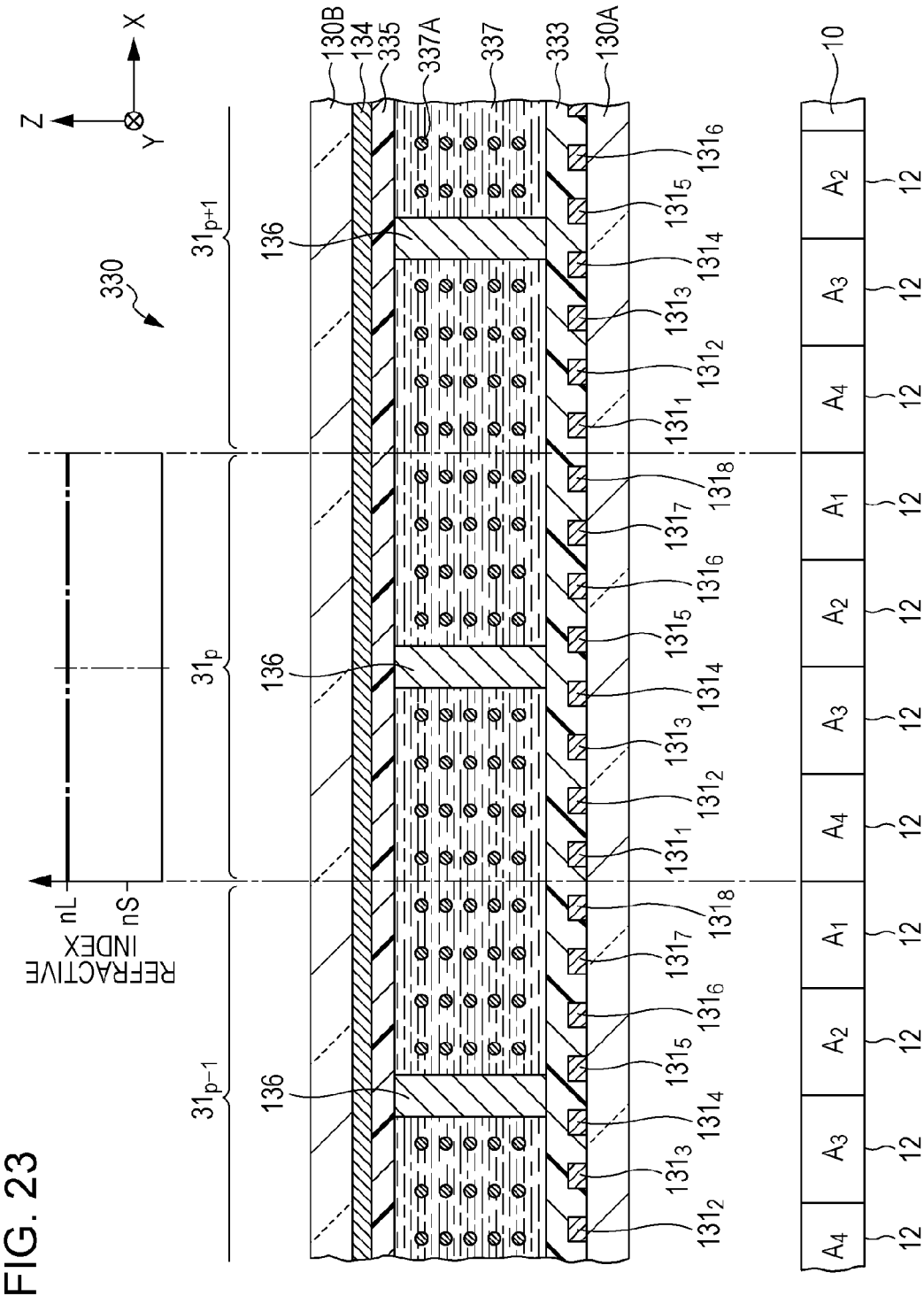
FIG. 23 is a schematic sectional view partially illustrating the variable lens array and an image display section when a normal image is displayed.
Figure 24:
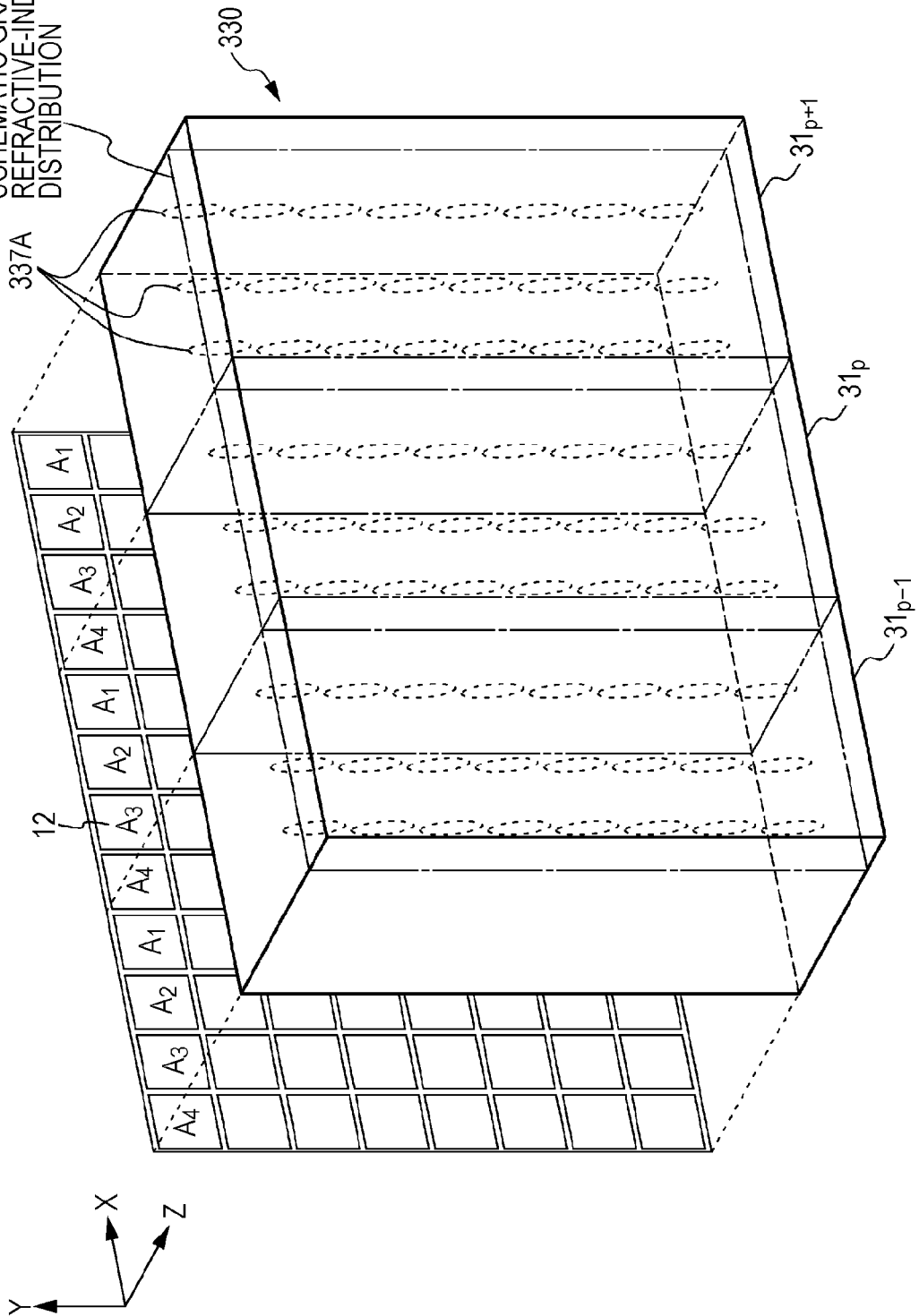
FIG. 24 is a schematic perspective view partially illustrating the image display section and the variable lens array.

FIG. 23 is a schematic sectional view partially illustrating the variable lens array and an image display section when a normal image is displayed. FIG. 24 is a schematic perspective view partially illustrating the image display section and the variable lens array.

When a normal image is displayed, for example, 30 [volt] is applied to the feeder wires $132_1$, $132_2$ . . . , and $132_4$. In this state, the voltage between the second electrode 134 and the first electrodes $131_2$, $131_2$ . . . , and $131_8$ is 30 [volt]. Accordingly, electric field is generated between the second electrode 134 and all the first electrodes 131, and the major axis of the liquid crystal molecules 337A is oriented to the Y direction.

In this state, the liquid crystal layer 337 functions as a simple transparent substrate formed of a material of which the refractive index is "nL". In other words, the refractive power of the lens lines 31 becomes small. Accordingly, the state of the image display apparatus 3 becomes similar to the state where the apparatus is not provided with the lens array, and thus it is possible to view a normal image.

Fourth Embodiment

The fourth embodiment also relates to the image display apparatus and the variable lens array according to the present disclosure.

The fourth embodiment is different from the third embodiment in the positions of the spacers constituting the variable lens array and in the value of the voltage applied to the first electrodes at the time of displaying a normal image. The fourth embodiment has the same configuration as the third embodiment except the different points mentioned above.

In the schematic perspective view of an image display apparatus 4 according to the fourth embodiment when it is virtually disassembled, the image display apparatus 4 is indicated instead of the image display apparatus 1 shown in FIG. 1, and a variable lens array 430 is indicated instead of the variable lens array 30.

Figure 25:
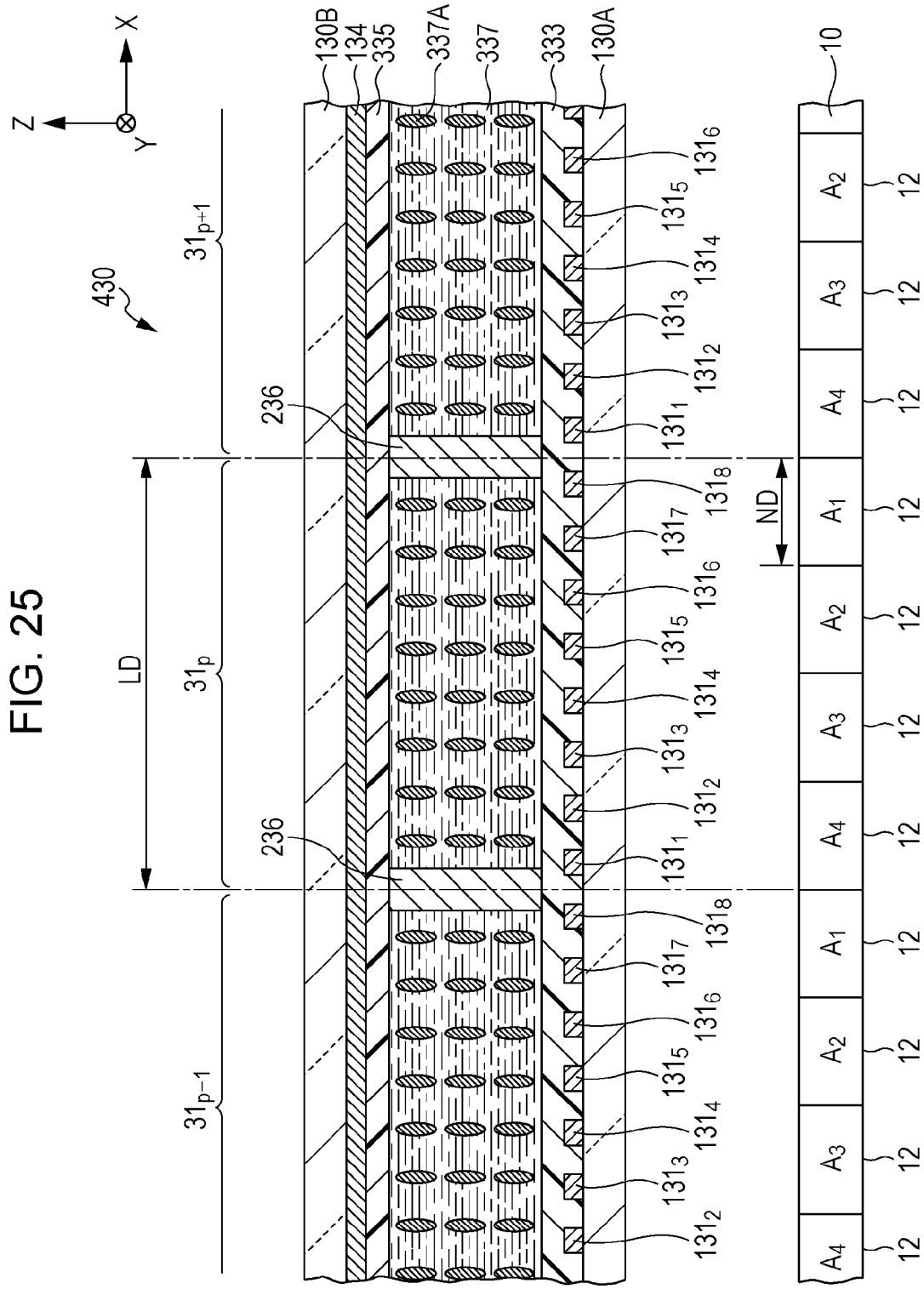
FIG. 25 is a sectional view partially illustrating a variable lens array according to a fourth embodiment.

FIG. 25 is a sectional view partially illustrating a variable lens array according to a fourth embodiment. Specifically, FIG. 25 is a sectional view taken along the XV-XV line when the variable lens array 430 is indicated instead of the variable lens array 230 of FIG. 13 in the second embodiment.

Referring to FIGS. 26 to 29, a configuration of the variable lens array 430 will be described.

As shown in FIG. 25, in the variable lens array 430, each wall-shaped spacer 236 is disposed at the boundary portion between the lens line 31 and the lens line 31 adjacent thereto. That is, the spacers 236 are respectively disposed at the boundary portions between the adjacent lens lines 31.

In the fourth embodiment, description will be given under the assumption that the major axis of the liquid crystal molecules 337A is oriented to the Z direction when electric field is not applied. In addition, FIG. 25 shows the orientation of the liquid crystal molecules 337A when electric field is not applied.

Subsequently, referring to FIGS. 26 to 29, the operations of the variable lens array 430 will be described. First, the operation at the time of displaying a stereoscopic image will be described, and subsequently, the operation at the time of displaying a normal image will be described.

Figure 26:
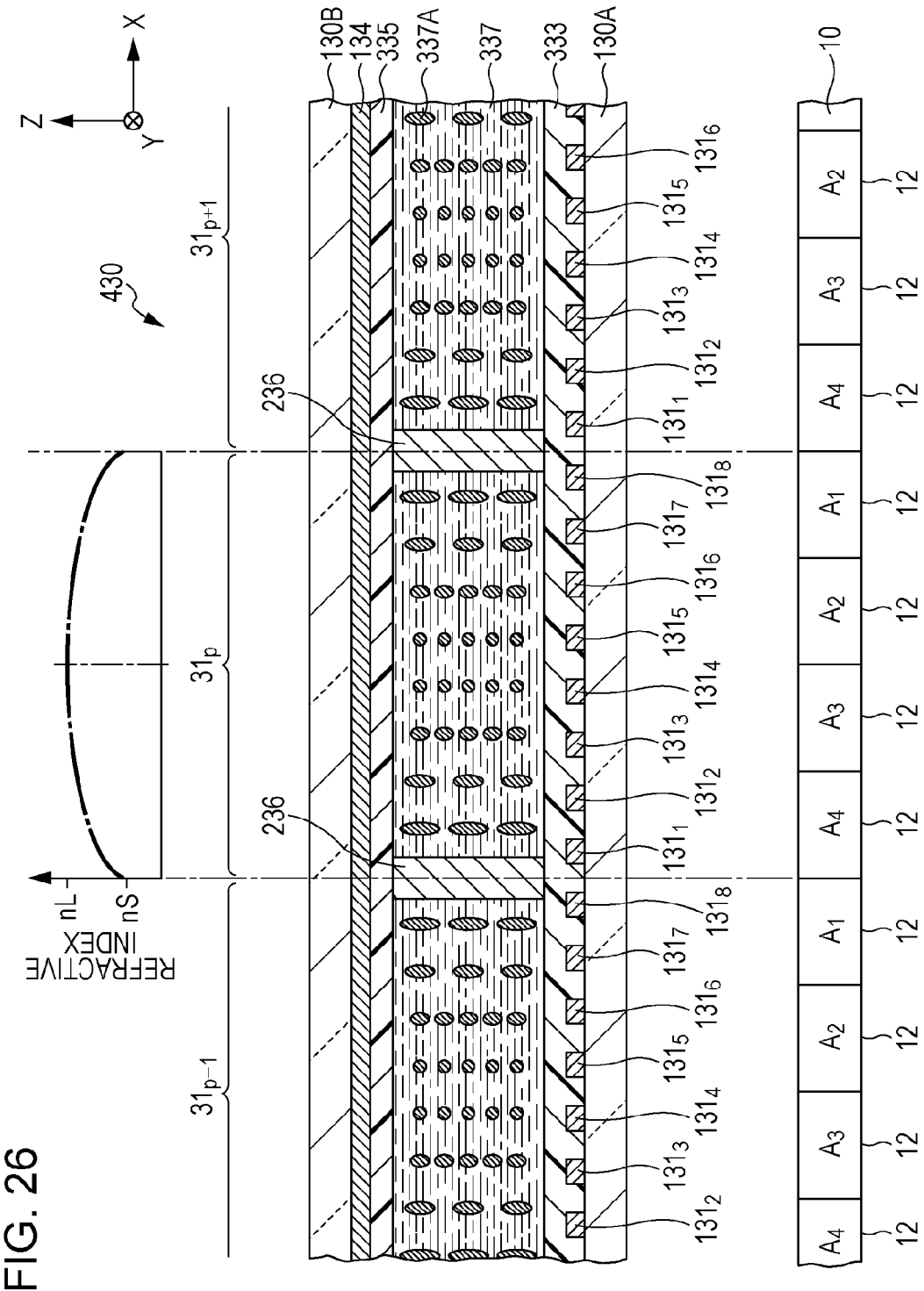
FIG. 26 is a schematic sectional view partially illustrating the variable lens array and an image display section when a stereoscopic image is displayed.
Figure 27:
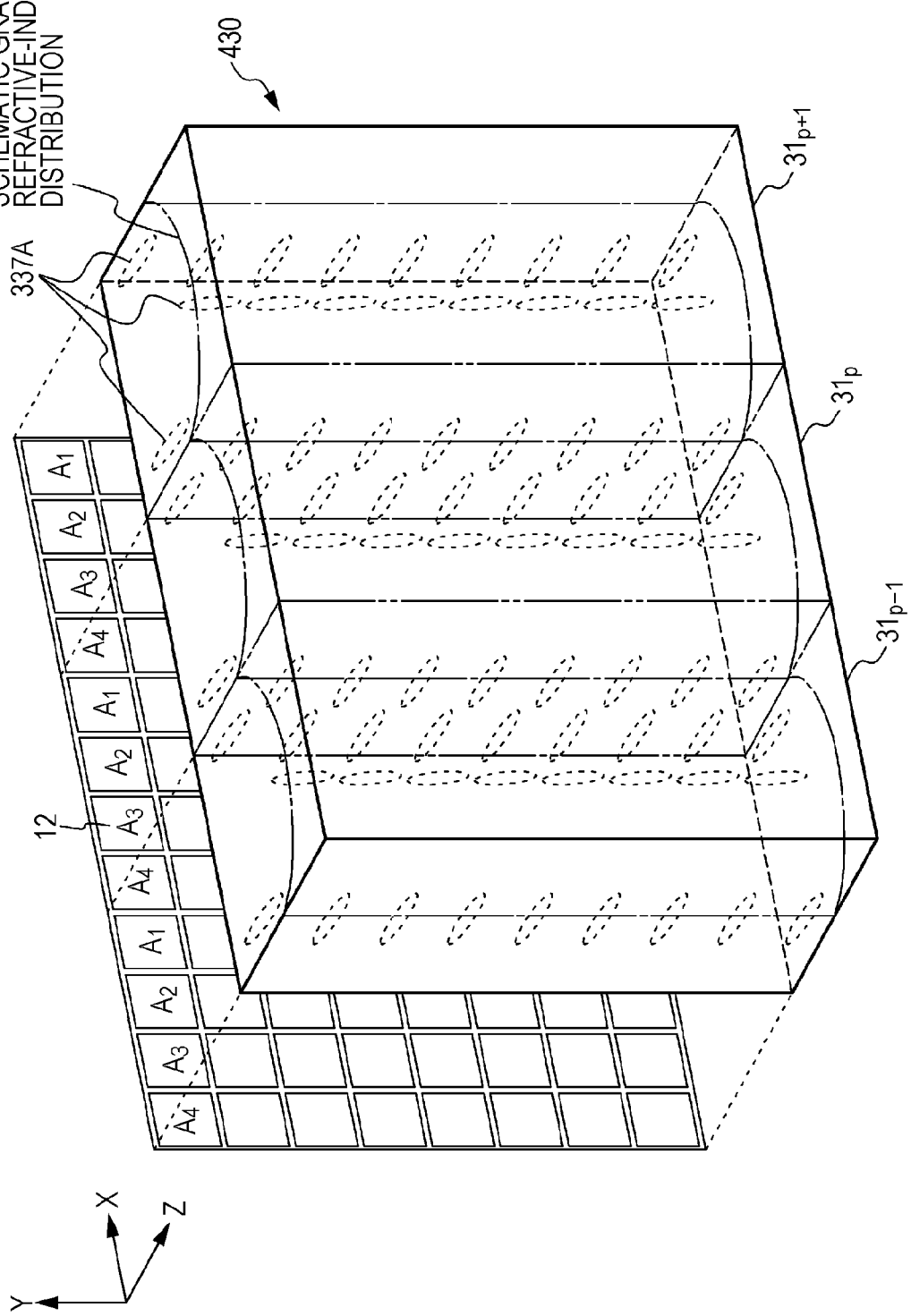
FIG. 27 is a schematic perspective view partially illustrating the image display section and the variable lens array.

FIG. 26 is a schematic sectional view partially illustrating the variable lens array and an image display section when a stereoscopic image is displayed. FIG. 27 is a schematic perspective view partially illustrating the image display section and the variable lens array.

At the time of operating the image display apparatus 4, for example, 0 [volt] is applied to the second electrode 134. Then, in the case of displaying a stereoscopic image, for example, 0 [volt] is applied to the feeder wire $132_1$, 10 [volt] is applied to the feeder wire $132_2$, 20 [volt] is applied to the feeder wire $132_3$, and 30 [volt] is applied to the feeder wire $132_4$.

The figure of the electric field, which is generated between the second electrode 134 and the first electrodes 131 in this state, is the same as that in the description which was given with reference to FIG. 21 in the third embodiment. The lens line 31 constitutes a liquid crystal GRIN lens functioning as a convex lens. The lens lines 31 of the stripe shape shown in FIG. 27 are supposed to be optically the same as the cylindrical convex lens lines, and are thus operated as a lenticular lens.

Figure 28:
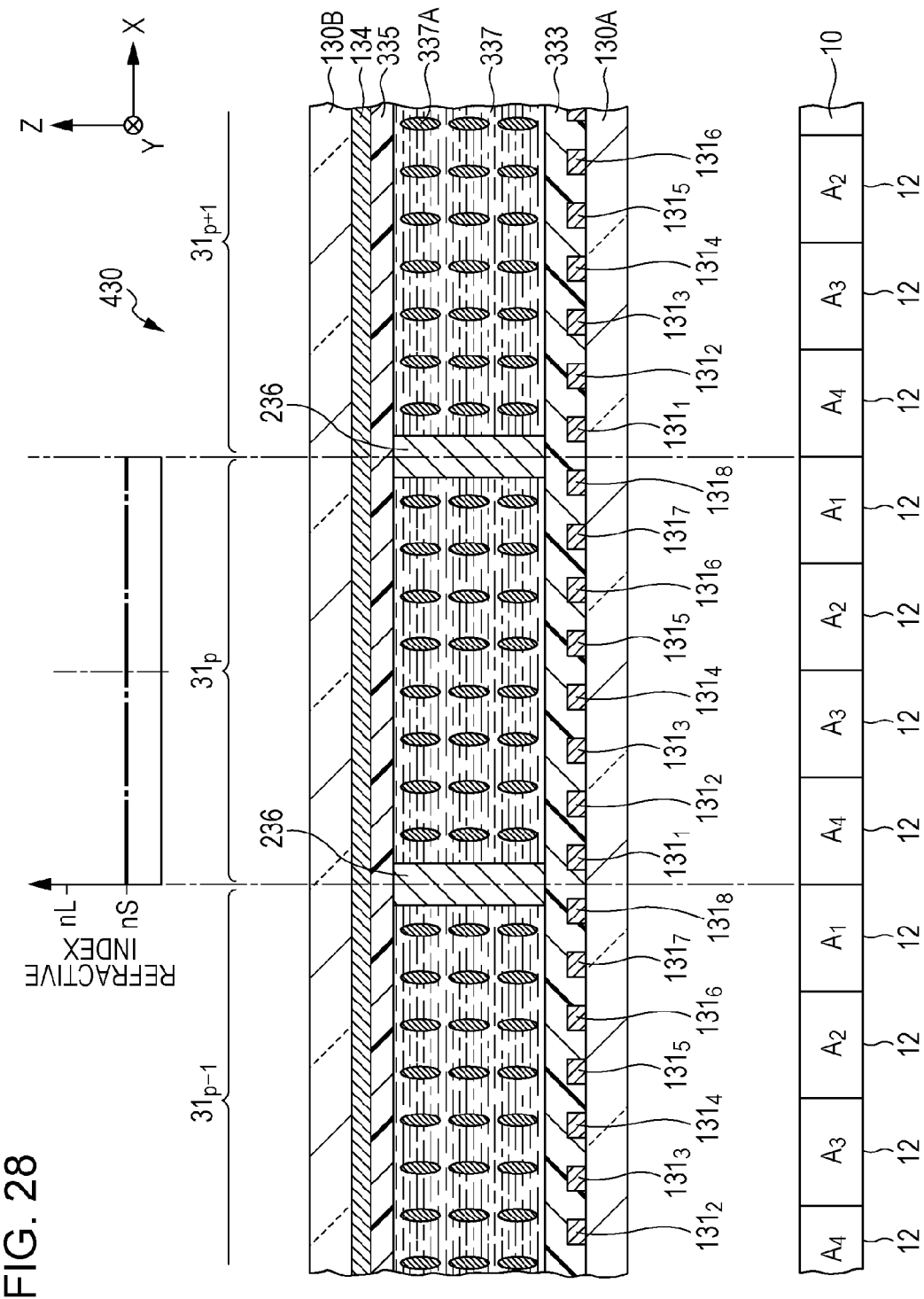
FIG. 28 is a schematic sectional view partially illustrating the variable lens array and an image display section when a normal image is displayed.
Figure 30A:
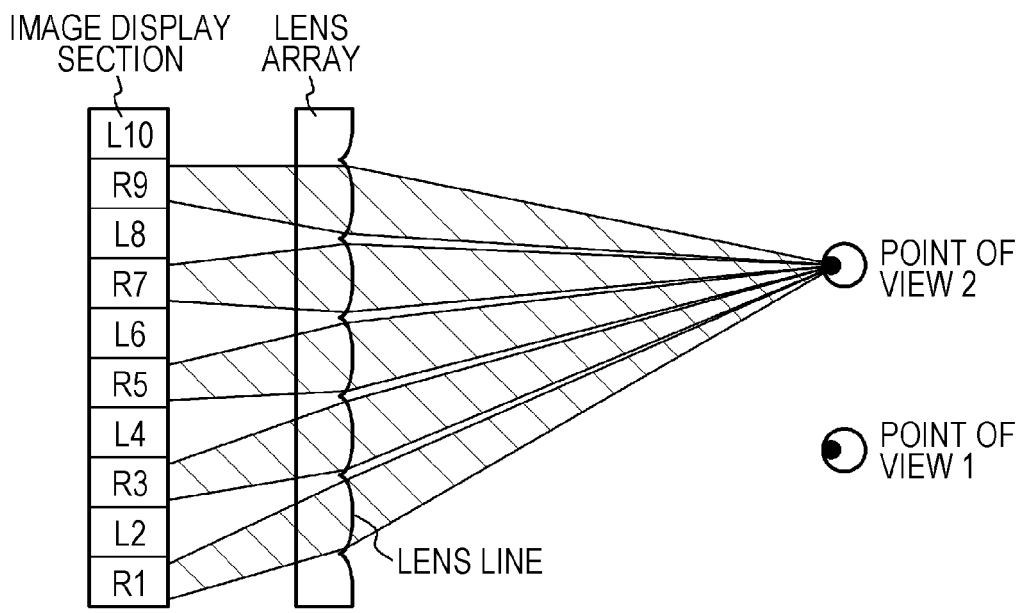
FIGS. 30A and 30B are conceptual diagrams of operations of the image display apparatus in which the lens array having lens lines is disposed between the image display section and an image viewer.
Figure 30B:
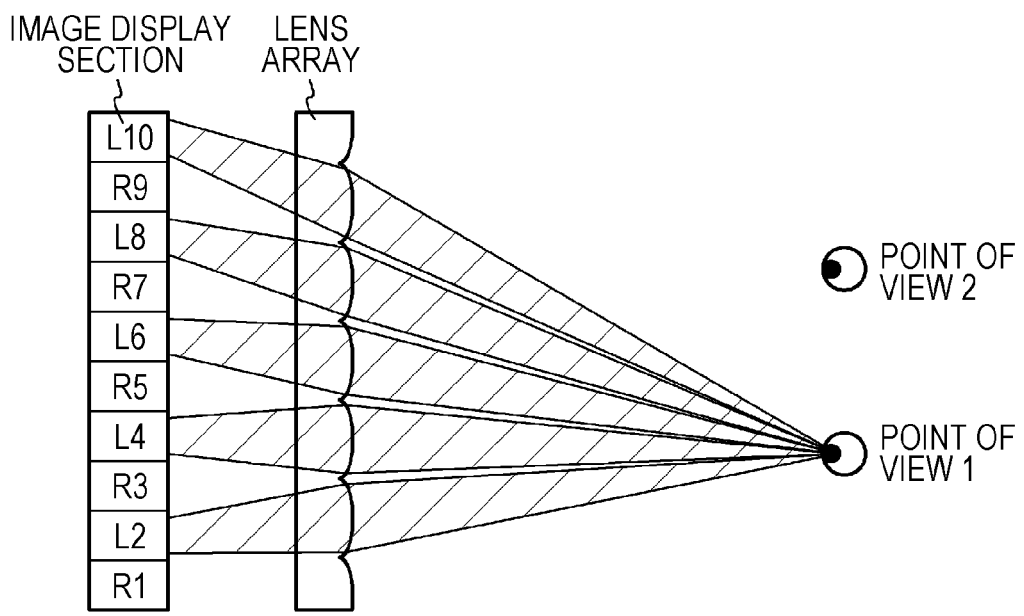

FIG. 28 is a schematic sectional view partially illustrating the variable lens array and an image display section when a normal image is displayed. FIG. 29 is a schematic perspective view partially illustrating the image display section and the variable lens array.

When a normal image is displayed, for example, 0 [volt] is applied to the feeder wires $132_1$, $132_2$ . . . , and $132_4$. Electric field is not generated between the second electrode 134 and all the first electrodes 131, and thus the major axis of the liquid crystal molecules 337A is oriented to the Z direction.

In this state, the liquid crystal layer 337 functions as a simple transparent substrate formed of a material of which the refractive index is "nS". In other words, the refractive power of the lens lines 31 shown in FIG. 29 becomes small. Accordingly, the state of the image display apparatus 4 becomes similar to the state where the apparatus is not provided with the lens array, and thus it is possible to view a normal image.

Hitherto, the embodiments of the present disclosure have been described in detail, but the present disclosure is not limited to the above-mentioned embodiments, and may be modified into various forms based on the technical scope of the present disclosure.

For example, in the respective embodiments, the spacers are formed on the second substrate 130B, but may be formed on the first substrate 130A. Further, in the respective embodiments, the alignment film is provided on all the surfaces on the liquid crystal layer sides of the first substrate 130A and the second substrate 130B. However, the alignment film is provided on either one thereof, and may not include the alignment film in some cases.

The present disclosure contains subject matter related to that disclosed in Japanese Priority Patent Application JP 2011-038679 filed in the Japan Patent Office on Feb. 24, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising:
   an image display section that displays a two-dimensional image; and
   a variable lens array that includes a first substrate having a first electrode, a second substrate having a second electrode, and a liquid crystal layer which is disposed between the first substrate and the second substrate, in which a value of a refractive power of each lens line thereof is changed by a voltage which is applied between the first electrode and the second electrode,
   wherein,
      the variable lens array is disposed to be opposed to the image display section,
      the lens lines extend along a first direction,
      wall-shaped or columnar spacers are disposed at boundary portions of the lens lines adjacent to each other and extend along the first direction,
   the first electrodes extend along the first direction,
      feeder wires are on the first substrate and extend in a second direction crossing the first direction, and
      each of the feeder wires is electrically connected to a group of the first electrodes that are arranged the same distance from each of the adjacent wall-shaped or columnar spacers.

2. The image display apparatus according to claim 1,
   an outer peripheral portion of the first substrate and an outer peripheral portion of the second substrate are sealed by a sealing portion, and
   a space is provided between an end portion of the wall-shaped or columnar spacers and the sealing portion.

3. A variable lens array comprising:
   a first substrate having a first electrode;
   a second substrate having a second electrode; and
   a liquid crystal layer that is disposed between the first substrate and the second substrate,
   wherein,
      a value of a refractive power of each lens line thereof is changed by a voltage which is applied between the first electrode and the second electrode,
      wall-shaped or columnar spacers are disposed at boundary portions of the lens lines adjacent to each other and extend along a first direction,
      the first electrodes extend along the first direction,
      feeder wires are on the first substrate and extend in a second direction crossing the first direction, and
      each of the feeder wires is electrically connected to a group of the first electrodes that are arranged the same distance from each of the adjacent wall-shaped or columnar spacers.

4. The variable lens array according to claim 3, wherein:
   an outer peripheral portion of the first substrate and an outer peripheral portion of the second substrate are sealed by a sealing portion, and
   a space is provided between an end portion of the wall-shaped or columnar spacers and the sealing portion.

* * * * *